(12) United States Patent
Tsukamoto et al.

(10) Patent No.: US 10,378,600 B2
(45) Date of Patent: Aug. 13, 2019

(54) BRAKING-FORCE-MAINTAINING DEVICE FOR VEHICLE AND ELECTRIC BRAKING DEVICE FOR VEHICLE

(71) Applicant: ADVICS CO., LTD., Kariya-shi, Aichi-ken (JP)

(72) Inventors: Shun Tsukamoto, Kariya (JP); Koichi Kokubo, Nagoya (JP)

(73) Assignee: ADVICS CO., LTD., Kariya-Shi, Aichi-Ken (JP)

(*) Notice: Subject to any disclaimer, the term of this patent is extended or adjusted under 35 U.S.C. 154(b) by 4 days.

(21) Appl. No.: 15/554,050

(22) PCT Filed: Mar. 31, 2016

(86) PCT No.: PCT/JP2016/060762
§ 371 (c)(1),
(2) Date: Aug. 28, 2017

(87) PCT Pub. No.: WO2016/159279
PCT Pub. Date: Oct. 6, 2016

(65) Prior Publication Data
US 2018/0073584 A1 Mar. 15, 2018

(30) Foreign Application Priority Data
Mar. 31, 2015 (JP) ................. 2015-073283

(51) Int. Cl.
*B60T 13/66* (2006.01)
*F16D 65/14* (2006.01)
(Continued)

(52) U.S. Cl.
CPC .............. *F16D 65/14* (2013.01); *B60T 1/005* (2013.01); *B60T 1/06* (2013.01); *B60T 1/062* (2013.01);
(Continued)

(58) Field of Classification Search
CPC ........... B60T 1/005; B60T 13/74; B60T 17/22
(Continued)

(56) References Cited

U.S. PATENT DOCUMENTS

| 4,200,002 | A * | 4/1980 | Takahashi | B60T 1/005 188/69 |
| 6,279,713 | B1 * | 8/2001 | Young | B60T 1/005 188/31 |
| 7,828,124 | B2 * | 11/2010 | Sano | B60T 1/005 188/156 |
| 9,874,258 | B2 * | 1/2018 | Lee | F16D 65/18 |
| 2003/0066719 | A1 * | 4/2003 | Watanabe | B60T 1/005 188/72.7 |

(Continued)

FOREIGN PATENT DOCUMENTS

JP 2007-137182 A 6/2007

OTHER PUBLICATIONS

International Search Report (PCT/ISA/210) dated May 31, 2016, by the Japanese Patent Office as the International Searching Authority for International Application No. PCT/JP2016/060762.

*Primary Examiner* — Christopher P Schwartz
(74) *Attorney, Agent, or Firm* — Buchanan Ingersoll & Rooney PC

(57) ABSTRACT

In an electric braking device for a vehicle, the following are carried out in order: a first lock process in which either torque for shifting the ratchet gear in a release direction is generated in an electric motor or the driving of the electric motor is stopped, while a pawl member is being pressed against a ratchet gear; a second lock process in which the rotational angle of the ratchet gear is brought to an angle different from a semi-engaging rotational angle by driving the electric motor; and a third lock process in which the ratchet gear is rotated in the release direction by driving the electric motor in reverse.

12 Claims, 11 Drawing Sheets

(51) Int. Cl.
*B60T 1/06* (2006.01)
*B60T 8/00* (2006.01)
*B60T 13/74* (2006.01)
*B60T 8/17* (2006.01)
*B60T 1/00* (2006.01)
*F16D 63/00* (2006.01)
*F16D 65/18* (2006.01)
*F16D 127/06* (2012.01)
*F16D 125/40* (2012.01)
*F16D 125/48* (2012.01)

(52) U.S. Cl.
CPC .............................. *B60T 8/00* (2013.01); *B60T 8/17* (2013.01); *B60T 13/74* (2013.01); *F16D 63/006* (2013.01); *F16D 65/18* (2013.01); *F16D 2125/40* (2013.01); *F16D 2125/48* (2013.01); *F16D 2127/06* (2013.01)

(58) Field of Classification Search
USPC .... 188/31, 69, 156–162, 265; 303/3, 15, 20, 303/122; 192/219.5
See application file for complete search history.

(56) References Cited

U.S. PATENT DOCUMENTS

| | | | |
|---|---|---|---|
| 2005/0258683 A1* | 11/2005 | Yamaguchi | B60T 1/005 303/89 |
| 2007/0114843 A1* | 5/2007 | Kawahara | B60T 7/12 303/122 |
| 2010/0051395 A1* | 3/2010 | Sano | B60T 1/005 188/162 |
| 2011/0290615 A1* | 12/2011 | Schwekutsch | F16H 63/3416 192/219.5 |

* cited by examiner

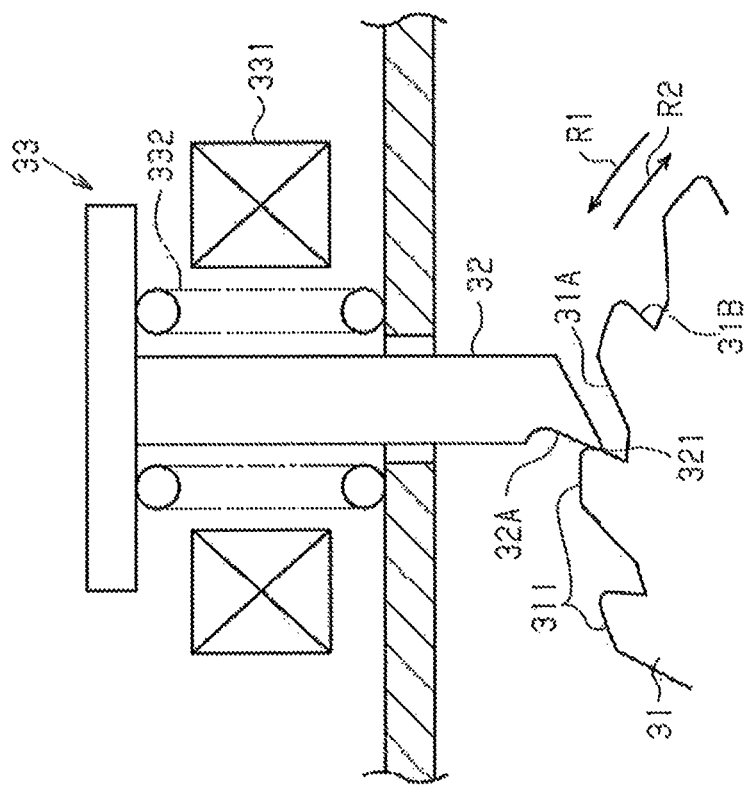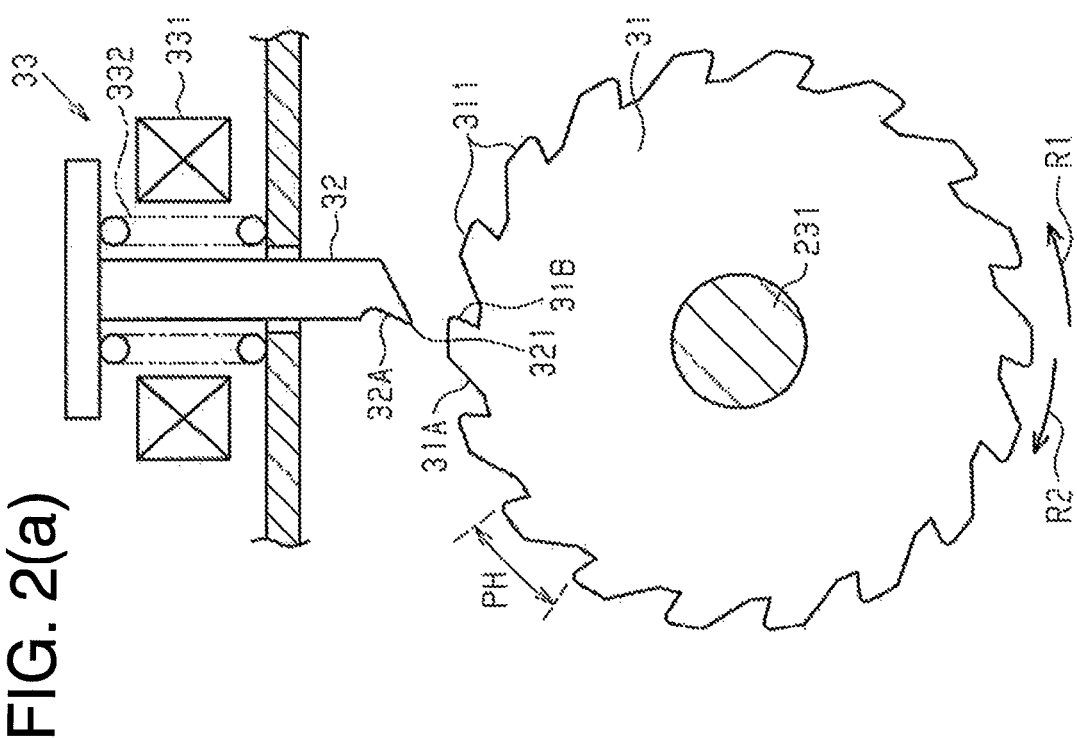

RELEASE DIRECTION

RELEASE DIRECTION

BRAKING-FORCE-MAINTAINING DEVICE FOR VEHICLE AND ELECTRIC BRAKING DEVICE FOR VEHICLE

TECHNICAL FIELD

The present invention relates to a braking-force-maintaining device for a vehicle which maintains a braking force applied to a wheel, and an electric braking device for a vehicle which includes the braking-force-maintaining device for a vehicle.

BACKGROUND ART

Patent Literature 1 describes an example of an electric braking device provided in a vehicle. Such an electric braking device includes a rotor, a friction member, a motor, a conversion mechanism, and a lock mechanism. The rotor rotates integrally with a wheel. The friction member applies a braking force to the wheel by being pressed against the rotor. The conversion mechanism converts a rotational motion of the motor into a linear motion and transmits the linear motion to the friction member. The lock mechanism maintains a pressing force of the friction member against the rotor.

For example, the lock mechanism includes a ratchet gear, a pawl member, and a solenoid. The ratchet gear is an example of a displacement member which rotates in accordance with rotation of the rotor of the motor. The pawl member is engaged with the ratchet gear. The solenoid moves the pawl member forward and backward. Then, the pawl member is moved by driving the solenoid and pressed against the ratchet gear. When the pawl member is meshed with a tooth of the ratchet gear, rotation of the ratchet gear is regulated in a release direction which is a direction reducing a force pressing the friction member against the rotor. As a result, the braking force applied to a wheel is maintained.

Incidentally, when the pawl member is not meshed with a tooth of the ratchet gear, if a command to stop energization to the motor or to rotate the rotor in a direction for lowering a braking force is input to the motor, the pawl member cannot regulate rotation of the ratchet gear in the release direction in some cases. When the ratchet gear rotates in the release direction, the braking force applied to a wheel is reduced.

Accordingly, in the electric braking device disclosed in Patent Literature 1, after a braking force is applied to a wheel by driving a motor, and a pawl member is pressed against a ratchet gear by driving a solenoid, a value of current flowing to the motor is reduced, and an inspection process is performed to detect a decrease amount of a force pressing a friction member against a rotor at this time. Then, when the decrease amount associated with the inspection process is less than a specified amount, it is determined that the pawl member is meshed with the tooth of the ratchet gear, and rotation of the ratchet gear in the release direction is regulated by the pawl member. On the other hand, when the decrease amount associated with the inspection process is equal to or greater than the specified amount, it is determined that the pawl member is not meshed with the tooth of the ratchet gear, and rotation of the ratchet gear in the release direction is not regulated by the pawl member. In this manner, when it is determined that the rotation of the ratchet gear in the release direction is not regulated by the pawl member, after the motor is driven such that the force pressing the friction member against the rotor increases, the pawl member is pressed against the ratchet gear again by driving the solenoid.

CITATION LIST

Patent Literature

Patent Literature 1: Unexamined Japanese Patent Publication No. 2007-137182

SUMMARY OF INVENTION

Technical Problems

As shown in FIG. 11, a tip of a tooth 410 of a ratchet gear 400 and a tip of a pawl member 500 are rounded because of manufacturing concerns and abrasion due to continued use of a lock mechanism. Therefore, not only the pawl member 500 is normally meshed with the tooth 410 of the ratchet gear 400 (refer to FIG. 11), but also a tip of the pawl member 500 is engaged with the tip of the tooth 410 of the ratchet gear 400 in some cases, as shown in FIG. 12. Such a state shown in FIG. 11 is also called "pawl member 500 is normally engaged with ratchet gear 400". The state shown in FIG. 12 is also called "pawl member 500 is semi-engaged with ratchet gear 400".

Even when the pawl member 500 is semi-engaged with the ratchet gear 400, a decrease amount of the pressing force by performing the inspection process may become less than a specified amount. In this case, it is erroneously determined that the pawl member 500 is normally meshed with the tooth 410 of the ratchet gear 400. In the case where the pawl member 500 is semi-engaged with the ratchet gear 400, in comparison with the case where the pawl member 500 is normally engaged with the ratchet gear 400, engagement between the pawl member 500 and the ratchet gear 400 is easily canceled if an external force is applied to an electric braking device. When the engagement between the pawl member 500 and the ratchet gear 400 is canceled, the ratchet gear 400 rotates in the release direction, a force pressing the friction member against a rotating member decreases, and a braking force applied to wheels is decreased.

An object of the present invention is to provide a braking-force-maintaining device for a vehicle which can suppress a decrease in a braking force applied to wheels by suppressing occurrence of an event that a pawl member is semi-engaged with a displacement member, and an electric braking device for a vehicle.

Solutions to Problems

A braking-force-maintaining device for a vehicle for solving the above-described problem is a device which maintains a braking force applied to a wheel by maintaining a force pressing a friction member against a rotor that rotates integrally with the wheel. The braking-force-maintaining device for a vehicle includes a displacement member, a pawl member, and a control device. In the displacement member which includes at least one tooth, a force pressing a friction member against a rotor increases when the displacement member is displaced in a braking direction which is one of specified directions, and the pressing force decreases when the displacement member is displaced in a release direction which is another one of the specified directions. The pawl member moves forward and backward in a direction toward and away from the displacement member and regulates displacement of the displacement member in the release direction when the pawl member is meshed with the tooth. The control device controls a first driving source which is a driving source of the displacement member and a second driving source which is a driving source of the pawl member. A position of the displacement member in the specified direction when a tip of the pawl member is in contact with a tip of the tooth is assumed to be a semi-engaging position. In this case, the control device performs a first lock process, a second lock process, and a third lock process. In the first lock process, under a circumstance that the pawl member is pressed against the displacement member by driving the second driving source, the control device performs a first lock process, the first driving source generates a torque for displacing the displacement member in a release direction, or driving of the first driving source which has generated a torque for displacing the displacement member in a braking direction is stopped. The second lock process is performed after the first lock process and displaces the displacement member in a braking direction or a release direction by driving the first driving source, and the second lock process sets a position of the displacement member in the specified direction to a position different from the semi-engaging position. The third lock process is performed after execution of the second lock process and displaces the displacement member in a release direction under a circumstance that the pawl member is pressed against the displacement member.

A state in which, although the pawl member is pressed against the displacement member, both of normal engagement and semi-engagement of the pawl member with the displacement member are not realized is called "state in which pawl member is not engaged with displacement member".

According to the above-described configuration, by pressing the pawl member against the displacement member, when the pawl member is normally engaged with the displacement member or when the pawl member is semi-engaged with the displacement member, even if the first lock process is performed, the possibility that the displacement member is displaced in a release direction is low. That is, it is highly possible that normal engagement of the pawl member with the displacement member or semi-engagement of the pawl member with the displacement member is maintained. On the other hand, even if the pawl member is pressed against the displacement member, if the pawl member is not engaged with the displacement member, the first lock process is performed. Consequently, the displacement member is displaced in a release direction, and the pawl member comes into contact with a tooth of the displacement member. That is, at the end of the first lock process, a position of the displacement member in the specified direction is substantially equal to the semi-engaging position.

Under such circumstances, by displacing the displacement member in a braking direction or a release direction by performing the second lock process, a position of the displacement member in the specified direction can be set to a position different from the semi-engaging position. As a result, even if the pawl member is semi-engaged with the displacement member at the end of the first lock process, the semi-engagement is canceled by performing the second lock process. Under such circumstances, by performing the third lock process, the displacement member is displaced in the release direction, the pawl member is normally meshed with a tooth of the displacement member, and the pawl member can be normally engaged with the displacement member. Therefore, by suppressing the occurrence of an event that the pawl member is semi-engaged with the displacement member, it is possible to suppress a decrease in a braking force applied to a wheel.

The braking-force-maintaining device for a vehicle may include a position detector which detects a position of the displacement member in the specified direction. Further, the displacement member may have a configuration in which a plurality of teeth is disposed along the specified direction. Then, it is assumed that the position of the displacement member in the specified direction at the end of the first lock process is a reference position. In this case, in the second lock process, the control device may displace the displacement member from the reference position in the specified direction by driving the first driving source, and stop driving the first driving source when a displacement amount of the displacement member in the specified direction from the reference position reaches a specified displacement amount. However, in the case where the specified displacement amount is denoted by "$\Delta MkaTh2$", an interval between adjacent teeth in the specified direction is denoted by "PH", "N" is a positive integer of "0 (zero)" or larger, and "M" is a value larger than 0 (zero) and less than "1", the specified displacement amount can be expressed by the following relational formula.

$$\Delta MkaTh2 = (N+M) \times PH$$

In the above-described configuration, a position separated from the reference position in the specified direction by the specified displacement amount is a position different from the semi-engaging position. Therefore, even if the pawl member is semi-engaged with the displacement member before starting the second lock process, by displacing the displacement member in the specified direction by performing the second lock process, the semi-engagement of the pawl member with the displacement member can be suitably canceled. By performing the third lock process in a state in which the pawl member is not semi-engaged with the displacement member, the pawl member is normally meshed with the teeth of the displacement member. As a result, the pawl member can be normally engaged with the displacement member.

Incidentally, in the braking-force-maintaining device for a vehicle, when the pawl member is meshed with the tooth of the displacement member, displacement of the displacement member in the braking direction may be allowed. Further, the displacement member may have a configuration in which a plurality of teeth is disposed along the specified direction. Further, in the second lock process, the control device displaces the displacement member in the braking direction by driving the first driving source under a circumstance that the pawl member is pressed against the displacement member by driving the second driving source. Consequently, a position of the displacement member in the specified direction may be set to a position different from the semi-engaging position. A torque for displacing the displacement member in the braking direction by driving of the first driving source is defined as a displacement torque. A minimum displacement torque capable of displacing the displacement member in the braking direction is defined as a specified torque reference value. A maximum displacement torque capable of limiting that the amount of displacement of the displacement member in the braking direction exceeds an interval between adjacent teeth in the specified direction is defined as a regulatable torque reference value. In this case, in the second lock process, the control device preferably sets the displacement torque to a torque larger than the specified torque reference value and smaller than the regulatable torque reference value by driving the first drive source.

According to the above-described configuration, when the second lock process is performed, the displacement torque increases, and when the displacement torque becomes larger than the specified torque reference value, the displacement member is displaced in the braking direction. Then, during the second lock process, a state is maintained in which the displacement torque is larger than the specified torque reference value and smaller than the regulatable torque reference value. Therefore, the second lock process is finished, and the third lock process is started under a circumstance that a position of the displacement member in the specified direction is different from a semi-engaging position. As a result, even if the pawl member is semi-engaged with the displacement member before starting the second lock process, by displacing the displacement member in the braking direction by performing the second lock process, a position of the displacement member in the specified direction is set to a position different from a semi-engaging position, and the semi-engagement of the pawl member with the displacement member can be suitably canceled. Then, by performing the third lock process under such circumstances, the pawl member is normally meshed with a tooth of the displacement member. As a result, the pawl member can be normally engaged with the displacement member.

Here, when the pawl member is pressed against the displacement member prior to starting the first lock process, the pawl member may be normally engaged with the displacement member, or the pawl member may be semi-engaged with the displacement member in some cases. Under such circumstances, even if the first lock process is performed, the displacement member hardly displaces in the release direction. On the other hand, when the pawl member is pressed against the displacement member prior to starting the first lock process, the pawl member may not be engaged with the displacement member in some cases. Under such circumstances, when the first lock process is performed, the displacement member is likely to be displaced in the release direction. Then, when the displacement member is displaced to some extent in the release direction, the pawl member is normally meshed with a tooth of the displacement member, and the pawl member is normally engaged with the displacement member. In this case, it is not necessary to perform the second lock process and the third lock process thereafter.

Therefore, it is assumed that a position of the displacement member in the specified direction at the time when the pawl member is pressed against the displacement member by driving the second driving source prior to performing the first lock process is a specific position. In this case, when a displacement amount of the displacement member in the release direction from the specific position associated with performing the first lock process is larger than a meshing determination displacement amount, preferably the control device does not perform the second lock process and the third lock process.

According to the above-described configuration, by setting the meshing determination displacement amount to an appropriate value to determine whether or not the displacement member has been displaced to some extent in the release direction by performing the first lock process, it can be determined whether the displacement amount of the displacement member in the release direction associated with performing the first rock process is large or small. Then, if it is determined that the displacement amount of the displacement member in the release direction associated with performing the first lock process is large, it can be determined that the pawl member is normally engaged with the displacement member by performing the first lock process. Therefore, the second lock process and the third lock process thereafter can be omitted. By omitting the second lock process and the third lock process as necessary in this manner, it is possible to appropriately shorten the time required to maintain a braking force applied to a wheel.

By performing the second lock process and the third lock process on the premise that the pawl member regulates displacement of the displacement member in the release direction by performing the first lock process, the occurrence of an event in which the pawl member is semi-engaged with the displacement member can be suppressed. Therefore, in the braking-force-maintaining device for a vehicle, when it is determined that the pawl member regulates displacement of the displacement member in the release direction by performing the first lock process, the control device preferably performs the second lock process. According to this configuration, by performing the first lock process, the second lock process, and the third lock process in order, it is possible to suppress the occurrence of an event that the pawl member is semi-engaged with the displacement member.

Further, the braking-force-maintaining device for a vehicle for solving the above-described problem is a device which maintains a braking force applied to a wheel by maintaining a force pressing a friction member against a rotor which rotates integrally with the wheel. The braking-force-maintaining device for a vehicle includes a displacement member, a pawl member, and a control device. In the displacement member which includes at least one tooth, a force pressing a friction member against a rotor increases when the displacement member is displaced in a braking direction which is one of specified directions, and the pressing force decreases when the displacement member is displaced in a release direction which is another one of the specified directions. The pawl member moves forward and backward in a direction toward and away from the displacement member and regulates displacement of the displacement member in the release direction when the pawl member is meshed with the tooth. The control device controls a first driving source which is a driving source of the displacement member and a second driving source which is a driving source of the pawl member. A position of the displacement member in the specified direction when a tip of the pawl member is in contact with a tip of the tooth is assumed to be a semi-engaging position. In this case, when maintaining the braking force applied to the wheels by engaging the pawl member with the displacement member, the control device determines whether or not there is a possibility that the displacement member is positioned at the semi-engaging position. When it is determined that there is a possibility that the displacement member is positioned at the semi-engaging position, the control device displaces the displacement member in the braking direction or the release direction by driving the first driving source, and on condition that a position of the displacement member in the specified direction is set to a position different from the semi-engaging position, the control device performs an engagement correction process for pressing the pawl member against the displacement member by driving the second driving source.

According to the above-described configuration, when the braking force applied to a vehicle is maintained, if there is a possibility that the displacement member is positioned at the semi-engaging position, the engagement correction process is performed before the pawl member is pressed against the displacement member. Then, the displacement member is displaced in the braking direction or the release direction, and the position of the displacement member in the specified direction is set to a position different from the semi-engaging position. In this state, since the pawl member is pressed against the displacement member, it is possible to suppress the occurrence of an event that a tip of the pawl member is caught on a tip of the tooth of the displacement member. Therefore, by suppressing the occurrence of an event that the pawl member is semi-engaged with the displacement member, it is possible to suppress a decrease in a braking force applied to a wheel.

The braking-force-maintaining device for a vehicle may include a position detector which detects a position of the displacement member in the specified direction. In this case, when the braking force applied to wheels is maintained by engaging the pawl member with the displacement member, based on the position of the displacement member in the specified direction detected by the position detector, preferably the control device determines whether there is a possibility that the displacement member is positioned at the semi-engaging position. According to this configuration, since the determination is made based on the position of the displacement member in the specified direction detected by the position detector, it is possible to determine the necessity of the engagement correction process.

In the above-described braking-force-maintaining device for a vehicle, in the engagement correction process, preferably the control device causes the displacement member to displace by driving the first driving source, such that a position of the displacement member in the specified direction detected by the position detector becomes different from the semi-engaging position. According to this configuration, since a displacement amount of the displacement member is adjusted based on a detection result by the position detector, a position of the displacement member in the specified direction is easily set to a position different from the semi-engaging position by performing the engagement correction process.

Further, the braking-force-maintaining device for a vehicle for solving the above-described problem is a device which maintains a braking force applied to a wheel by maintaining a force pressing a friction member against a rotor which rotates integrally with the wheel. The braking-force-maintaining device for a vehicle includes a displacement member, a pawl member, a position detector, and a control device. In the displacement member which includes at least one tooth, a force pressing a friction member against a rotor increases when the displacement member is displaced in a braking direction which is one of specified directions, and the pressing force decreases when the displacement member is displaced in a release direction which is another one of the specified directions. The pawl member moves forward and backward in a direction toward and away from the displacement member and regulates displacement of the displacement member in the release direction when being meshed with the tooth. The position detector detects a position of the displacement member in the specified directions. The control device controls a first driving source which is a driving source of the displacement member and a second driving source which is a driving source of the pawl member. A position of the displacement member in the specified direction when a tip of the pawl member is in contact with a tip of the tooth is assumed to be a semi-engaging position. In this case, when a braking force applied to wheels is equal to or greater than a required braking force, the control device presses the pawl member against the displacement member by driving the second driving source on condition that a position of the displacement member in the specified direction detected by the position detector is set to a position different from a semi-engaging position by driving the first driving source.

According to the above-described configuration, the pawl member is pressed against the displacement member in a state in which a position of the displacement member in the specified direction is set to a position different from the semi-engaging position. Therefore, when the braking force is maintained by pressing the pawl member against the displacement member, the occurrence of an event that a tip of the pawl member is caught on a tip of the tooth of the displacement member can be suppressed. Therefore, by suppressing the occurrence of an event that the pawl member is semi-engaged with the displacement member, it is possible to suppress a decrease in a braking force applied to a wheel.

To solve the above-described problem, an electric braking device for a vehicle includes a rotor which rotates integrally with the wheel, a friction member pressed against the rotor, and the above-described braking-force-maintaining device for a vehicle. Then, the first driving source is a motor, and the motor is drivingly connected to the friction member. Further, a braking force corresponding to the force pressing the friction member against the rotor is applied to a wheel. According to this configuration, it is possible to suitably maintain the braking force applied to wheels by driving the motor.

BRIEF DESCRIPTION OF DRAWINGS

FIG. 2(a) is a schematic view showing a schematic configuration of a lock mechanism of the electric braking device for a vehicle. FIG. 2(b) is a schematic view showing a state in which a pawl member is semi-engaged with a displacement member in the lock mechanism.

FIG. 3 is a timing chart in the case of maintaining a braking force applied to wheels in the electric braking device for a vehicle.

In the electric braking device for a vehicle.

FIG. 7 is a timing chart for maintaining a braking force applied to wheels of an electric braking device for a vehicle according to a second embodiment.

FIG. 9 is a timing chart in the case of maintaining a braking force applied to wheels in an electric braking device for a vehicle according to a third embodiment.

DESCRIPTION OF EMBODIMENTS

First Embodiment

Hereinafter, a first embodiment embodying a braking-force-maintaining device for a vehicle and an electric braking device for a vehicle will be described with reference to FIGS. 1 to 5.

Figure 1:
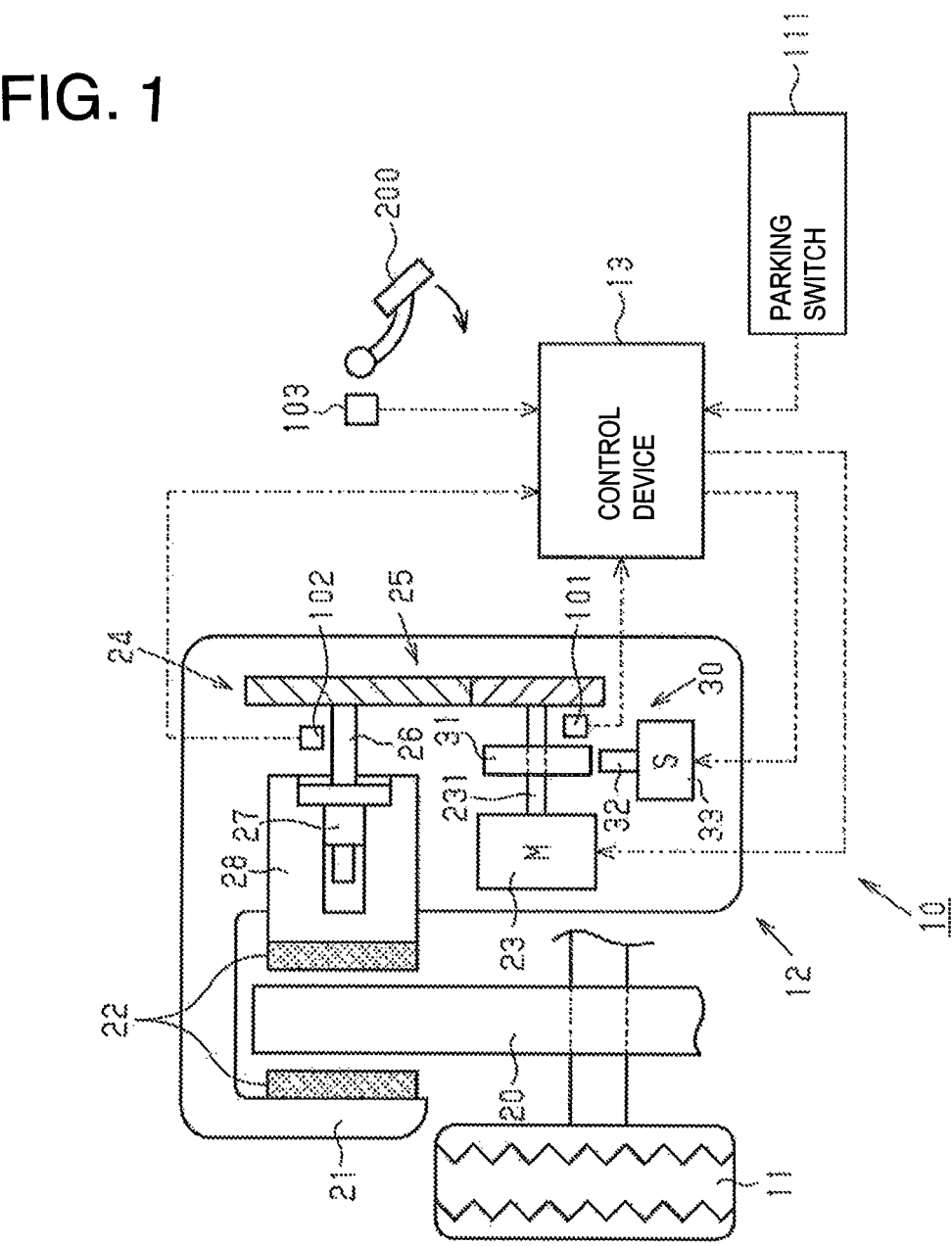
FIG. 1 is a block diagram schematically showing an electric braking device for a vehicle according to a first embodiment.

As shown in FIG. 1, an electric braking device 10 for a vehicle includes an electrically operated brake actuator 12 provided for each wheel 11 and a control device 13 for controlling the brake actuator 12. For example, the electric braking device 10 applied to a vehicle having four wheels 11 includes a total of four brake actuators 12.

The brake actuator 12 is a disc-type electric actuator and includes a brake disc 20 which is an example of a rotor integrally rotating with the wheel 11, and a brake caliper 21 supported by a vehicle body. The brake caliper 21 supports a pair of brake pads 22 disposed on both sides of the brake disc 20 in a vehicle width direction which is the horizontal direction in the drawing. These brake pads 22 correspond to an example of "friction member". The brake pads 22 are movable in a direction toward and away from the brake disc 20, and as a force pressing the brake pads 22 against the brake disc 20 increases, a large braking force is applied to the wheel 11.

As a brake actuator used in the electric braking device 10, in addition to the disk-type, a drum-type electric actuator can also be used. In this case, the brake drum corresponds to an example of "rotor", and a brake shoe corresponds to an example of "friction member".

The brake caliper 21 includes a motor 23 and a transmission mechanism 24 for transmitting an output from the motor 23 to the brake pads 22. When the motor 23 is driven, an output from the motor 23 is transmitted to the brake pads 22 through the transmission mechanism 24. As a result, the brake pads 22 are pressed against the brake disc 20, or the pressing of the brake pads 22 against the brake disc 20 is canceled.

In the present description, driving of the motor 23 for moving the brake pads 22 closer to the brake disc 20 or for increasing a force pressing the brake pads 22 against the brake disc 20 is also called positive driving. Driving of the motor 23 for reducing the force pressing the brake pads 22 against the brake disc 20 and for separating the brake pads 22 from the brake disc 20 is also called reverse driving. For example, by flowing a positive current to the motor 23, the positive driving of the motor 23 can be realized, and reverse driving of the motor 23 can be realized by flowing a negative current to the motor 23. A rotational direction of the output shaft 231 of the motor 23 during positive driving of the motor 23 is opposite to a rotational direction of the output shaft 231 during reverse driving of the motor 23.

The transmission mechanism 24 includes a speed reducer 25 which reduces and outputs a rotational speed of the output shaft 231 of the motor 23, and a shaft member 26 connected to an output side of the speed reducer 25. The shaft member 26 rotates when an output torque from the motor 23 is transmitted through the speed reducer 25. At this time, the shaft member 26 rotates in a direction conforming to a rotational direction of the output shaft 231 of the motor 23.

The transmission mechanism 24 is provided with a screw member 27 connected to a tip of the shaft member 26 and a piston 28 supporting the brake pad 22. The screw member 27 is positioned inside the piston 28, and a peripheral surface of the screw member 27 is externally threaded. That is, the peripheral surface of the screw member 27 is a male screw portion.

An inner peripheral surface of the piston 28 is internally threaded. That is, the inner peripheral surface of the piston 28 is a female screw portion into which the male screw portion of the screw member 27 is screwed. Therefore, rotational motion of the screw member 27 is converted into a linear motion and inputted to the piston 28. That is, an example of "transducer" is formed which converts rotational motion of the output shaft 231 of the motor 23 into linear motion by the screw member 27 and the piston 28 and outputs the linear motion to the brake pad 22.

In addition, among a plurality of brake actuators 12 provided in a vehicle, some of the brake actuators 12 are provided with a lock mechanism 30 for maintaining a braking force applied to the wheels 11 as shown in FIG. 1. For example, as the brake actuator 12 having the lock mechanism 30, a brake actuator for a rear wheel can be used.

Although described in detail later, the lock mechanism 30 includes a ratchet gear 31, a pawl member 32, and a solenoid 33. The ratchet gear 31 is an example of a displacement member which is fixed to the output shaft 231 of the motor 23 and rotates integrally with the output shaft 231. The pawl member 32 moves forward and backward in a direction toward and away from the ratchet gear 31. The solenoid 33 is an example of a second driving source which is a power source of the pawl member 32. The ratchet gear 31 rotates based on driving of the motor 23. Therefore, in the electric braking device 10 for a vehicle according to the present embodiment, the motor 23 is an example of "first driving source" which is a driving source of the ratchet gear 31.

As shown in FIG. 1, a rotational angle detection sensor 101 and a pressing force sensor 102 are electrically connected to the control device 13. The rotational angle detection sensor 101 is an example of a position detector for detecting a rotational angle Mka of the output shaft 231 of the motor 23, that is, the ratchet gear 31. The pressing force sensor 102 detects a force pressing the brake pad 22 by the piston 28. The pressing force detected by the pressing force sensor 102 is correlated with a force pressing the brake pad 22 against the brake disc 20. Therefore, the control device 13 can estimate the force pressing the brake pad 22 against the brake disc 20, based on the pressing force detected by the pressing force sensor 102.

In addition, a stroke sensor 103 for detecting an operation amount of a brake pedal 200 is electrically connected to the control device 13. The control device 13 calculates a required braking force requested by a driver, based on the operation amount detected by the stroke sensor 103. Then, the control device 13 controls driving of the motor 23 in accordance with the calculated required braking force. For example, the control device 13 positively drives the motor 23 when the required braking force increases and reversely drives the motor 23 when the required braking force decreases.

A parking switch 111 is electrically connected to the control device 13. When the parking switch 111 is turned on in a situation in which a vehicle is stopped, the control device 13 positively drives the motor 23 so as to apply a braking force necessary to stop the vehicle to the wheel 11 and controls driving of the motor 23 and the solenoid 33 to maintain this state. Then, the control device 13 stops driving of the motor 23 and the solenoid 33 after confirming the state in which the braking force applied to the wheel 11 is maintained by the lock mechanism 30. Therefore, by maintaining a force pressing the brake pads 22 against the brake disc 20 rotating integrally with the wheel 11 by the control device 13, the lock mechanism 30, and the motor 23, an example of "braking-force-maintaining device for vehicle" which maintains the braking force applied to the wheel 11 is configured.

Next, with reference to FIG. 2, the lock mechanism 30 will be described. As shown in FIGS. 2(a) and 2(b), the ratchet gear 31 of the lock mechanism 30 includes a plurality of teeth 311 disposed at equal intervals along a circumferential direction which is one example of specified directions. In the example shown in FIG. 2, the counterclockwise direction which is one of the circumferential directions is a rotational direction of the output shaft 231 and the ratchet gear 31 during positively driving the motor 23. Therefore, when the ratchet gear 31 is rotating (displacing) in the counterclockwise direction, since the motor 23 is positively driven, a force pressing the brake pads 22 against the brake disc 20 increases. On the other hand, the clockwise direction which is the other one of the circumferential directions is a rotational direction of the output shaft 231 and the ratchet gear 31 during reversely driving the motor 23. Therefore, when the ratchet gear 31 rotates in the clockwise direction, the force pressing the brake pads 22 against the brake disc 20 decreases. Therefore, in the present description, the counterclockwise direction in FIG. 2 corresponds to "braking direction R1", and the clockwise direction in FIG. 2 corresponds to "release direction R2".

When the pawl member 32 moves downward in the drawing (that is, in a direction toward the ratchet gear 31) by driving the solenoid 33, the pawl member 32 is pressed against the ratchet gear 31. At this time, when the pawl member 32 is meshed with the tooth 311 of the ratchet gear 31, rotation of the ratchet gear 31 in the release direction R2 is regulated by the pawl member 32, and the braking force applied to the wheel 11 is maintained. On the other hand, even when the ratchet gear 31 is engaged with the pawl member 32, rotation in the braking direction R1 of the ratchet gear 31 is allowed.

The tooth 311 includes a first tooth surface 31A and a second tooth surface 31B. The first tooth surface 31A is positioned closer to the braking direction R1 than the second tooth surface 31B and is gradually inclined so as to position radially outwardly in the release direction R2. Therefore, when the pawl member 32 is in contact with the first tooth surface 31A, the ratchet gear 31 can rotate in both the braking direction R1 and the release direction R2. That is, even in a state in which the pawl member 32 is pressed against the ratchet gear 31, when the pawl member 32 is in contact with the first tooth surface 31A, it can be said that the pawl member 32 is not engaged with the ratchet gear 31.

The second tooth surface 31B can be in surface contact with a meshing surface 32A of the pawl member 32. When the meshing surface 32A of the pawl member 32 is in surface contact with the second tooth surface 31B, rotation of the ratchet gear 31 in the release direction R2 is regulated by the pawl member 32. That is, when the meshing surface 32A of the pawl member 32 is in surface contact with the second tooth surface 31B of the tooth 311, it can be said that the pawl member 32 is normally engaged with the ratchet gear 31.

As shown in FIGS. 2(a) and 2(b), the solenoid 33 of the lock mechanism 30 includes a coil 331 to which a current is supplied. When the solenoid 33 is energized, that is, when a current flows to the coil 331, the pawl member 32 moves downward in the drawing, and the pawl member 32 is pressed against the ratchet gear 31. When the meshing surface 32A of the pawl member 32 is in surface contact with the second tooth surface 31B of the tooth 311 of the ratchet gear 31, and the pawl member 32 is normally engaged with the ratchet gear 31, even if energizing to the solenoid 33 is canceled, a position of the pawl member 32 in an axial direction which is a vertical direction in the drawing is maintained. That is, a state in which rotation of the ratchet gear 31 in the release direction R2 is regulated by the pawl member 32 is continued.

However, in this state, when the motor 23 is positively driven, and the ratchet gear 31 is rotated in the braking direction R1, the second tooth surface 31B of the tooth 311 separates from the meshing surface 32A of the pawl member 32, and the pawl member 32 comes into contact with the first tooth surface 31A. As a result, when the ratchet gear 31 continues to rotate in the braking direction R1, the pawl member 32 is pressed upward in the drawing (that is, in a direction away from the ratchet gear 31) by the first tooth surface 31A of the tooth 311. At this time, when the solenoid 33 is not energized, the pawl member 32 moves upward in the drawing by an energizing force from a spring 332 and separates from the ratchet gear 31. As a result, maintaining the braking force by the lock mechanism 30 is canceled.

In the lock mechanism 30, a tip 321 of the pawl member 32 and a tip of the tooth 311 of the ratchet gear 31 are rounded. Therefore, as shown in FIG. 2(b), it is possible to maintain a state in which the tip 321 of the pawl member 32 is caught on the tip of the tooth 311 of the ratchet gear 31. Even when such state is maintained, rotation of the ratchet gear 31 in the release direction R2 may be regulated by the pawl member 32 in some cases. The state in which the tip 321 of the pawl member 32 is caught on the tip of the tooth 311 as described above is also called "state in which pawl member 32 is semi-engaged with ratchet gear 31". In a state where the pawl member 32 is semi-engaged with the ratchet gear 31 and the solenoid 33 is not energized, when an external force or the like is applied to the brake actuator 12, the semi-engagement is canceled, and the ratchet gear 31 may rotate in the release direction R2.

Next, with reference to FIGS. 3 and 4, an example of a method for normally engaging the pawl member 32 with the ratchet gear 31 will be described.

Figure 3A:
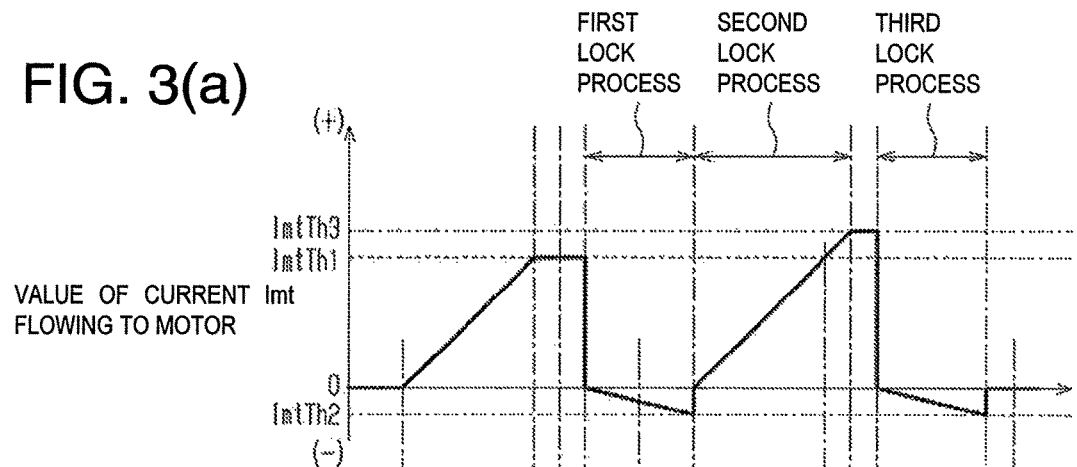
FIG. 3(a) shows transition of a value of current flowing to a first driving source.
Figure 3B:
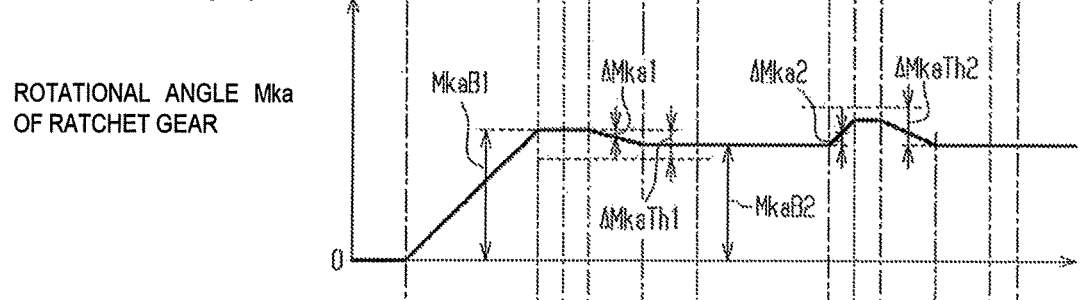
FIG. 3(b) shows transition of a position of a displacement member in a specified direction.
Figure 3C:
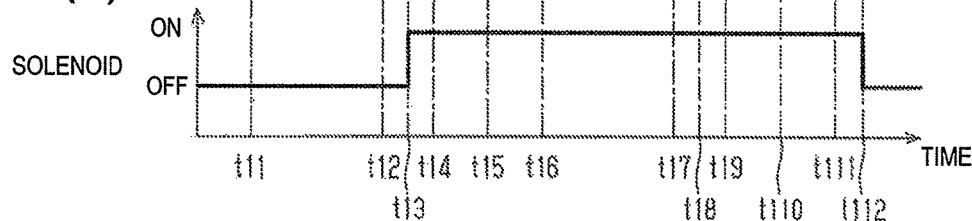
FIG. 3(c) shows transition of a driving state of a second driving source.

As shown in FIGS. 3(a), 3(b), and 3(c), when the parking switch 111 is turned on at a first timing t11 at which a vehicle is stopped, a positive current flows to the motor 23, and the motor 23 is positively driven. Then, a value of current Imt flowing to the motor 23 gradually increases, and a force pressing the brake pads 22 against the brake disc 20 increases. As a result, a braking force applied to the wheel 11 increases. Further, when the current value Imt increases, and an output torque from the motor 23 increases as described above, the ratchet gear 31 rotates in the braking direction R1, and the rotational angle Mka thereof increases. In the electric braking device 10 for a vehicle according to the present embodiment, the rotational angle Mka of the ratchet gear 31 corresponds to an example of "position of displacement member in specified direction".

Then, at a second timing t12, a braking force applied to the wheel 11 becomes equal to a required braking force BPT, and when the value of current Imt flowing to the motor 23 becomes equal to the required current value ImtTh1 correlated with the required braking force BPT, the current value Imt is maintained. Then, at the next third timing t13, energization to the solenoid 33 is started, and the pawl member 32 is pressed against the ratchet gear 31. The rotational angle Mka of the ratchet gear 31 at this time point is set to "specific rotational angle MkaB1". That is, this specific rotational angle MkaB1 corresponds to an example of "position of displacement member in specified direction at time when pawl member is pressed against displacement member".

At a fourth timing t14 at which the pawl member 32 is pressed against the ratchet gear 31, a first lock process is started in which a torque in the motor 23 for rotating the ratchet gear 31 in the release direction R2 generates. In the first lock process, the motor 23 is reversely driven under the circumstance that the pawl member 32 is pressed against the ratchet gear 31. That is, the value of current Imt flowing to the motor 23 gradually decreases from "0 (zero)".

When the ratchet gear 31 is rotated in the release direction R2, a rotation amount (displacement amount) of the ratchet gear 31 from the specific rotational angle MkaB1 in the release direction R2 increases. The rotation amount of the ratchet gear 31 from the specific rotational angle MkaB1 in the release direction R2 is called "specific rotational angle change amount ΔMka1".

In the example shown in FIG. 3, although the first lock process is performed until a sixth timing t16, rotation of the ratchet gear 31 in the release direction R2 is stopped at a fifth timing t15 before the sixth timing t16. That is, during performing the first lock process, the pawl member 32 comes into contact with the tooth 311 of the ratchet gear 31, and rotation of the ratchet gear 31 in the release direction R2 is regulated by the pawl member 32.

As described above, prior to starting the first lock process, the pawl member 32 is pressed against the ratchet gear 31 at the third timing t13. The pawl member 32 may be normally engaged with or semi-engaged with the ratchet gear 31 without performing the first lock process. In this case, even if the motor 23 is reversely driven by the first lock process, the ratchet gear 31 hardly rotates in the release direction R2. Therefore, the specific rotational angle change amount ΔMka1 does not become too large.

Examples of the case where the pawl member 32 is normally engaged with or semi-engaged with the ratchet gear 31 at the time when the pawl member 32 is pressed against the ratchet gear 31 as described above include a case where the rotational angle Mka of the ratchet gear 31 is substantially equal to the semi-engaging rotational angle MkaA at the third timing t13. The semi-engagement rotational angle MkaA is the rotational angle Mka of the ratchet gear 31 in the case where the pawl member 32 is semi-engaged with the ratchet gear 31. That is, in the present description, the semi-engaging rotational angle MkaA corresponds to "semi-engaging position".

Figure 4A:
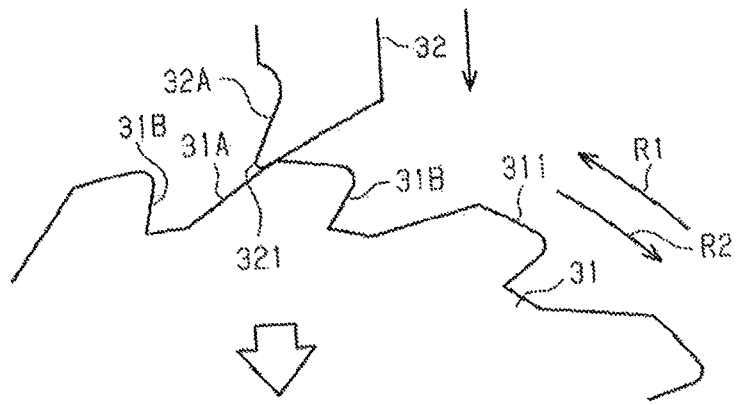
FIG. 4(a) is an action diagram showing a state in which the pawl member is pressed against the displacement member, FIG. 4 (b) is an action diagram showing a state in which the displacement member is displaced in a release direction by performing a first lock process.
Figure 4B:
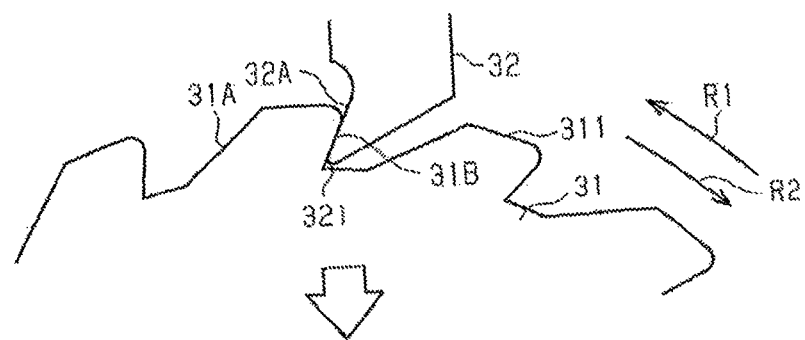
FIG. 4(C) is an action diagram showing a state in which the displacement member is displaced in a braking direction by performing a second lock process.
FIG. 4(d) is an action diagram showing a state in which the pawl member is normally engaged with the displacement member by performing a third lock process.

Further, as shown in FIG. 4(a), when the pawl member 32 is pressed against the ratchet gear 31 at the third timing t13, although the pawl member 32 is pressed against the ratchet gear 31, the tip 321 of the pawl member 32 is in contact with the first tooth surface 31A of the tooth 311 of the ratchet gear 31, and the pawl member 32 is not engaged with the ratchet gear 31 in some cases. In this case, when the motor 23 is reversely driven by performing the first lock process, the ratchet gear 31 rotates in the release direction R2, and the specific rotational angle change amount ΔMka1 easily increases. When the ratchet gear 31 rotates to some extent in the release direction R2, as shown in FIG. 4(b), the meshing surface 32A of the pawl member 32 is in surface contact with the second tooth surface 31B of the tooth 311, the pawl member 32 is normally engaged with the ratchet gear 31, and rotation of the ratchet gear 31 in the release direction R2 is regulated by the pawl member 32. That is, when the specific rotational angle change amount ΔMka1 in the first lock process is relatively large, it can be determined that the pawl member 32 is normally engaged with the ratchet gear 31 by performing the first lock process.

Therefore, in the electric braking device 10 according to the present embodiment, the meshing determination change amount ΔMkaTh1 (i.e., a meshing determination displacement amount) is set in advance as a value for determining whether or not the specific rotational angle change amount ΔMka1 is large. When the specific rotational angle change amount ΔMka1 is larger than the meshing determination change amount ΔMkaTh1, the pawl member 32 is in contact with the first tooth surface 31A of the tooth 311 of the ratchet gear 31 before performing the first lock process, and thus it can be determined that the pawl member 32 is normally engaged with the ratchet gear 31 by performing the first lock process. Therefore, energization to the solenoid 33 is completed without performing the second lock process and the third lock process to be described later.

On the other hand, as in the example shown in FIG. 3, when the specific rotational angle change amount ΔMka1 is equal to or less than the meshing determination change amount ΔMkaTh1, the pawl member 32 is semi-engaged with the ratchet gear 31 before performing the first lock process, and thus it is possible to determine that there is a possibility that the semi-engagement is maintained even after performing the first lock process. Therefore, by performing the second lock process and the third lock process to be described later in order, the semi-engagement is canceled, and the ratchet gear 31 is normally engaged with the pawl member 32.

That is, the second lock process is started from the sixth timing t16 at which the first lock process is finished. In the second lock process, the ratchet gear 31 is rotated in the braking direction R1 or the release direction R2, and the rotational angle Mka of the ratchet gear 31 is set to an angle different from the semi-engaging rotational angle MkaA. In the electric braking device 10 for a vehicle according to the present embodiment, by rotating the ratchet gear 31 in the braking direction R1 while keeping a state in which the pawl member 32 is pressed against the ratchet gear 31, the rotational angle Mka is changed to a different angle from the semi-engaging rotational angle MkaA.

When the rotational angle Mka of the ratchet gear 31 is equal to the semi-engaging rotational angle MkaA, it can be determined that there is a possibility that the pawl member 32 is semi-engaged with the ratchet gear 31. The case where the second lock process is performed is the case where there is a possibility that the pawl member 32 is semi-engaged with the ratchet gear 31 at the end of the first lock process. Therefore, when the rotational angle Mka of the ratchet gear 31 at the sixth timing t16, which is the end point of the first lock process, is set as a reference rotational angle MkaB2, which is an example of a reference position, in the example shown in FIG. 3, the reference rotational angle MkaB2 can be regarded as the semi-engaging rotational angle MkaA.

When the second lock process is performed, the motor 23 is positively driven, and the ratchet gear 31 is rotated in the braking direction R1. That is, from the sixth timing t16, the value of current Imt flowing to the motor 23 gradually increases from "0 (zero)", and an output torque from the motor 23 gradually increases. A torque for rotating the ratchet gear 31 in the braking direction R1 by performing the second lock process as described above is also called "displacement torque". The displacement torque is correlated with the output torque from the motor 23 and increases as the current value Imt increases.

The value of current Imt flowing to the motor 23 reaches the required current value ImtTh1 at a seventh timing t17. That is, in the period from the sixth timing t16 to the seventh timing t17, an output torque from the motor 23 is smaller than the output torque from the motor 23 at the third timing t13. Therefore, in this period, the output shaft 231 of the motor 23 and the ratchet gear 31 are hardly rotated in the braking direction R1.

Figure 4C:
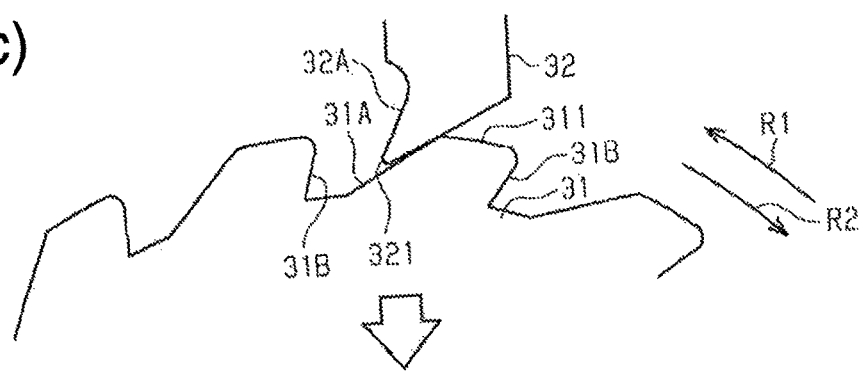

However, the value of current Imt flowing to the motor 23 at the seventh timing t17 reaches the required current value ImtTh1, and the current value Imt continues to increase even after the seventh timing t17. Therefore, the ratchet gear 31 rotates in the braking direction R1 after the seventh timing t17. Therefore, as shown in FIG. 4(c), as the current value Imt increases, the rotational angle Mka of the ratchet gear 31 separates from the semi-engagement rotational angle MkaA, that is, the reference rotational angle MkaB2. The current value Imt reaches a third determination current value ImtTh3 at an eighth timing t18. Therefore, the second lock process is finished, and the increase in the current value Imt is finished.

Here, the amount of rotation of the ratchet gear 31 in the braking direction R1 in the second lock process is defined as the specified change amount ΔMkaTh2 (i.e., the specified displacement amount), and an interval of the teeth 311 adjacent to each other in a circumferential direction in the ratchet gear 31 is denoted by "PH". In this case, the specified change amount ΔMkaTh2 is smaller than the interval PH. For example, the specified change amount ΔMkaTh2 can be expressed by the following relational formula (Formula 1). In the relational formula (Formula 1), "N" indicates a positive integer of "0 (zero)" or larger (in this example, 0 (zero)), and "M" indicates a value larger than "0" and smaller than "1" (for example, 0.5).

$$\Delta MkaTh2 = (N+M) \times PH \quad \text{(Formula 1)}$$

In the electric braking device 10 for a vehicle according to the present embodiment, a third determination current value ImtTh3 is set such that the rotation amount of the ratchet gear 31 in the braking direction R1 in the second lock process becomes equal to the specified change amount ΔMkaTh2. Specifically, the third determination current value ImtTh3 is set such that a difference obtained by subtracting the required current value ImtTh1 from the third determination current value ImtTh3 is correlated with the specified change amount ΔMkaTh2. That is, the third determination current value ImtTh3 is set to a larger value as the required current value ImtTh1 increases. In the second lock process, by increasing the value of current Imt flowing to the motor 23 up to the third determination current value ImtTh3, the pawl member 32 can be brought into contact with the first tooth surface 31A of the tooth 311 of the ratchet gear 31.

Figure 4D:
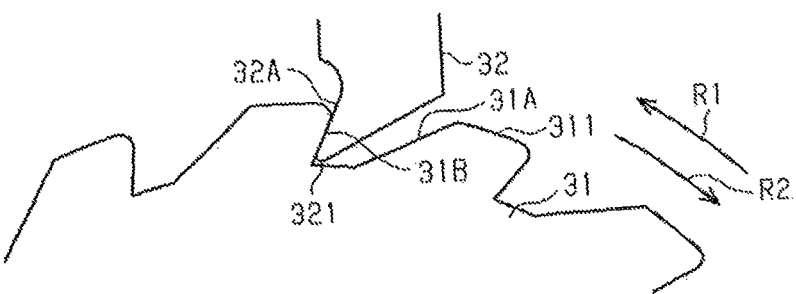

As shown in FIGS. 3(a) to 3(c), the third lock process is started from a ninth timing t19 after the second lock process is finished. Since the third lock process is a process for rotating the ratchet gear 31 in the release direction R2, the value of current Imt flowing to the motor 23 is gradually decreased from "0 (zero)". As a result, the motor 23 is reversely driven, and the ratchet gear 31 is rotated in the release direction R2. Then, the second tooth surface 31B of the tooth 311 of the ratchet gear 31 gradually approaches the meshing surface 32A of the pawl member 32. Then, at a tenth timing t110 at which the current value Imt is decreasing, as shown in FIG. 4(d), the meshing surface 32A of the pawl member 32 is in surface contact with the second tooth surface 31B of the tooth 311 of the ratchet gear 31, and the pawl member 32 is normally engaged with the ratchet gear 31. At the subsequent eleventh timing t111, the current value Imt reaches the second determination current value ImtTh2, and the third lock process is finished. That is, the third lock process is finished in a state in which the pawl member 32 is normally engaged with the ratchet gear 31. Then, at the subsequent twelfth timing t112, energization to the solenoid 33 is finished, and a series of processing for maintaining a braking force to the wheels 11 is finished.

Next, with reference to a flowchart shown in FIG. 5, a process routine performed by the control device 13 to maintain the braking force applied to the wheel 11 will be described. This process routine is performed when the parking switch 111 is turned on, and the value of current Imt flowing to the motor 23 reaches the required current value ImtTh1.

Figure 5:
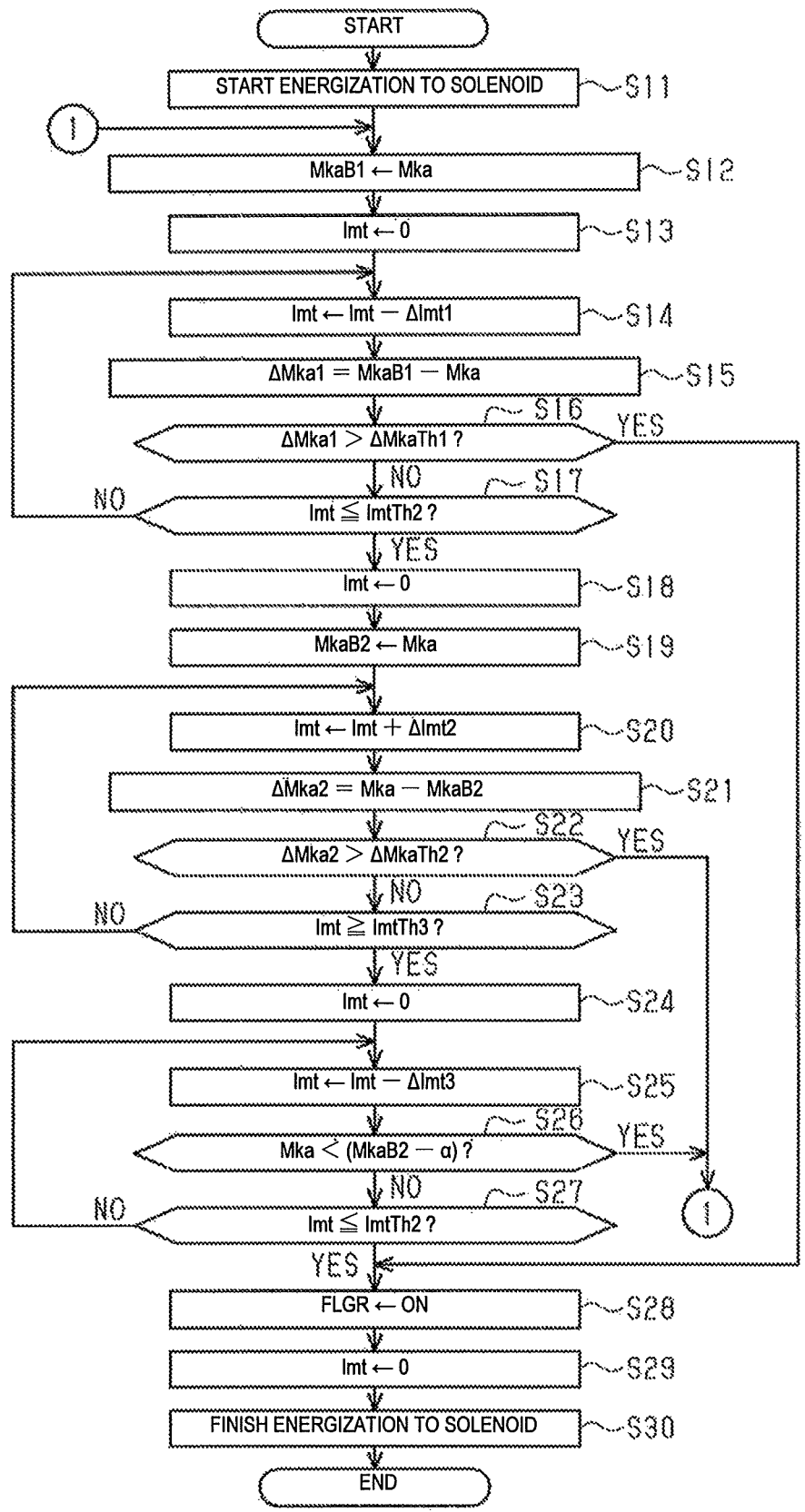
FIG. 5 is a flowchart describing a process routine performed by a control device of the electric braking device for a vehicle and performed for maintaining a braking force applied to wheels.

As shown in FIG. 5, in the present process routine, the control device 13 starts energization to the solenoid 33 and presses the pawl member 32 against the ratchet gear 31 (step S11). Subsequently, the control device 13 acquires the current rotational angle Mka of the ratchet gear 31 detected by the rotational angle detection sensor 101 and sets the rotational angle Mka as the specific rotational angle MkaB1 (step S12). Then, the control device 13 sets the value of current Imt flowing to the motor 23 to "0 (zero)" (step S13) and starts the first lock process.

That is, the control device 13 decreases the value of current Imt flowing to the motor 23 by a first change value ΔImt1 (step S14). The first change value ΔImt1 is a value larger than "0 (zero)". Therefore, during performing the first lock process, the current value Imt is reduced at a speed corresponding to the first change value ΔImt1. The control device 13 acquires the current rotational angle Mka of the ratchet gear 31 detected by the rotational angle detection sensor 101 and calculates the specific rotational angle change amount ΔMka1 which is a rotational angle change amount from the specific rotational angle MkaB1 (Step S15). That is, the control device 13 subtracts the current rotational angle Mka from the specific rotational angle MkaB1 and sets the difference (=MkaB1−Mka) as the specific rotational angle change amount ΔMka1.

Subsequently, the control device 13 determines whether or not the calculated specific rotational angle change amount ΔMka1 is larger than the above-described meshing determination change amount ΔMkaTh1 (step S16). When the specific rotational angle change amount ΔMka1 is larger than the meshing determination change amount ΔMkaTh1 (step S16: YES), the control device 13 does not perform the second lock process and the third lock process and proceeds to step S28 to be described later. On the other hand, when the specific rotational angle change amount ΔMka1 is equal to or less than the meshing determination change amount ΔMkaTh1 (step S16: NO), the control device 13 determines whether the value of current Imt flowing to the motor 23 is equal to or less than the second determination current value ImtTh2 (Step S17). When the current value Imt is larger than the second determination current value ImtTh2 (step S17: NO), the control device 13 shifts the processing to the above-described step S14 and continues performing the first lock process.

On the other hand, when the value of current Imt flowing to the motor 23 is equal to or less than the second determination current value ImtTh2 (step S17: YES), the control device 13 sets the current value Imt to "0 (zero)" and finishes the first lock process (step S18). Subsequently, the control device 13 acquires the current rotational angle Mka of the ratchet gear 31 detected by the rotational angle detection sensor 101 and sets the rotational angle Mka as the reference rotational angle MkaB2 (step S19).

Then, the control device 13 starts the second lock process. That is, the control device 13 increases the value of current Imt flowing to the motor 23 by the second change value ΔImt2 (step S20). The second change value ΔImt2 is a value larger than "0 (zero)", for example, a value larger than the first change value ΔImt1. Therefore, in the second lock process, the current value Imt is increased at a speed corresponding to the second change value ΔImt2. Subsequently, the control device 13 acquires the current rotational angle Mka of the ratchet gear 31 detected by the rotational angle detection sensor 101 and calculates the reference rotational angle change amount ΔMka2 which is a rotational angle change amount from the reference rotational angle MkaB2 (step S21). That is, the control device 13 subtracts the reference rotational angle MkaB2 from the current rotational angle Mka and sets the difference (=Mka−MkaB2) as the reference rotational angle change amount ΔMka2.

Then, the control device 13 determines whether or not the calculated reference rotational angle change amount ΔMka2 is larger than the specified change amount ΔMkaTh2 (step S22). It can be determined that the rotation amount of the ratchet gear 31 in the second lock process is larger than an assumed amount when the reference rotational angle change amount ΔMka2 is larger than the specified change amount ΔMkaTh2. That is, when the reference rotational angle change amount ΔMka2 is larger than the specified change amount ΔMkaTh2, there is a possibility that the second lock process is failed.

Therefore, when the reference rotational angle change amount ΔMka2 is larger than the specified change amount ΔMkaTh2 (step S22: YES), the control device 13 shifts the processing to the above-described step S12. That is, the control device 13 starts over from the first lock process. On the other hand, when the reference rotational angle change amount ΔMka2 is equal to or less than the specified change amount ΔMkaTh2 (step S22: NO), the control device 13 determines whether or not the value of current Imt flowing to the motor is equal to or larger than the third determination current value ImtTh3 (Step S23). When the current value Imt is smaller than the third determination current value ImtTh3 (step S23: NO), the control device 13 shifts the processing to the above-described step S20 and continues the second lock process. On the other hand, when the current value Imt is equal to or larger than the third determination current value ImtTh3 (step S23: YES), the control device 13 sets the current value Imt to "0 (zero)" (step S24), and the second lock process is finished.

Then, the control device 13 starts the third lock process. That is, the control device 13 decreases the value of current Imt flowing to the motor 23 by a third change value ΔImt3 (step S25). The third change value ΔImt3 is a value larger than "0 (zero)", for example, a value smaller than the second change value ΔImt2. Therefore, in the third lock process, the current value Imt is reduced at a speed corresponding to the third change value ΔImt3. The third change value ΔImt3 may be equal to the first change value ΔImt1.

Subsequently, the control device 13 determines whether or not the meshing surface 32A of the pawl member 32 comes into surface contact with the second tooth surface 31B of the tooth 311 of the ratchet gear 31 by performing the third lock process. For example, when the rotational angle Mka of the ratchet gear 31 rotating in the release direction R2 is substantially equal to the reference rotational angle MkaB2 by performing the third lock process, it is possible to determine that the meshing surface 32A of the pawl member 32 comes into surface contact with the second tooth surface 31B of the tooth 311. In other words, when the rotational angle Mka is still larger than a sum obtained by adding an offset value α to the reference rotational angle MkaB2, it can be determined that the ratchet gear 31 is rotating such that the rotational angle Mka approaches the reference rotational angle MkaB2. Further, when the rotational angle Mka is already smaller than a difference obtained by subtracting the offset value α from the reference rotational angle MkaB2, it can be determined that the ratchet gear 31 is still rotating even if the rotational angle Mka passes through the reference rotational angle MkaB2, and the third lock process may be failed.

Therefore, the control device 13 acquires the current rotational angle Mka of the ratchet gear 31 detected by the rotational angle detection sensor 101, and it is determined whether or not the current rotational angle Mka is smaller than the difference obtained by subtracting the offset value α from the reference rotational angle MkaB2 (step S26). When the current rotational angle Mka is smaller than the difference (=MkaB2−α) (step S26: YES), the processing is shifted to the above-described step S12. That is, when there is a possibility that the third lock process has failed, the control device 13 starts over from the first lock process.

On the other hand, when the current rotational angle Mka is equal to or larger than the difference (=MkaB2−α) (step S26: NO), the control device 13 determines whether or not the value of current Imt flowing to the motor 23 is equal to or smaller than the second determination current value ImtTh2 (step S27). When the current value Imt is larger than the second determination current value ImtTh2 (step S27: NO), the control device 13 shifts the processing to the above-described step S25 and continues performing the third lock process. On the other hand, when the current value Imt is equal to or less than the second determination current value ImtTh2 (step S27: YES), the control device 13 finishes performing the third lock process and shifts the processing to the next step S28.

In step S28, the control device 13 sets the lock complete flag FLGR to ON. Subsequently, the control device 13 sets the value of current Imt flowing to the motor 23 to "0 (zero)" (step S29) and then finishes energization to the solenoid 33 (step S30). Then, the control device 13 finishes this process routine.

According to the above-described configuration and operation, the following effects can be obtained.

(1-1) When the pawl member 32 is normally engaged with or semi-engaged with the ratchet gear 31 by pressing the pawl member 32 against the ratchet gear 31, the possibility that the ratchet gear 31 rotates in the release direction R2 is low even if the first lock process is performed. That is, there is a high possibility that the normal engagement of the pawl member 32 against the ratchet gear 31 or the semi-engagement of the pawl member 32 against the ratchet gear 31 is maintained. On the other hand, even if the pawl member 32 is pressed against the ratchet gear 31, when the pawl member 32 is not engaged with the ratchet gear 31, the ratchet gear 31 is rotated in the release direction R2 by performing the first lock process, and the pawl member 32 comes into contact with the tooth 311 of the ratchet gear 31. That is, at the end of the first lock process, the rotational angle Mka of the ratchet gear 31 is substantially equal to the semi-engaging rotational angle MkaA.

The rotational angle Mka of the ratchet gear 31 can be set to an angle different from the semi-engaging rotational angle MkaA by rotating the ratchet gear 31 in the braking direction R1 by performing the second lock process under such circumstances. As a result, even if the pawl member 32 is semi-engaged with the ratchet gear 31 at the end of the first lock process, the semi-engagement is canceled by performing the second lock process. Under such circumstances, by performing the third lock process, the ratchet gear 31 is rotated in the release direction R2, and the meshing surface 32A of the pawl member 32 comes into surface contact with the second tooth surface 31B of the tooth 311 of the ratchet gear 31, and the pawl member 32 is normally engaged with the ratchet gear 31.

Therefore, by sequentially performing the first lock process, the second lock process, and the third lock process, the occurrence of an event that the pawl member 32 is semi-engaged with the ratchet gear 31 is suppressed. As a result, a decrease in a braking force applied to the wheel can be suppressed.

(1-2) The specified change amount ΔMkaTh2, which is the amount of rotation of the ratchet gear 31 in the braking direction R1 in the second lock process, can be expressed by the relational formula (Formula 1). Therefore, even if the pawl member 32 is normally engaged with or semi-engaged with the ratchet gear 31 at the time of the end of the first lock process, by performing the second lock process, the rotational angle Mka of the ratchet gear 31 can be set to an angle different from the semi-engaging rotational angle MkaA. By performing the third lock process in a state in which the pawl member 32 is not semi-engaged with the ratchet gear 31 as described above, the meshing surface 32A of the pawl member 32 is in surface contact with the second tooth surface 31B of the tooth 311 of the ratchet gear 31. As a result, the pawl member 32 can be normally engaged with the ratchet gear 31.

(1-3) When the specific rotational angle change amount ΔMka1, which is a rotation amount of the ratchet gear 31 in the release direction R2, is larger than the meshing determination change amount ΔMkaTh1 by performing the first lock process, it can be determined that the pawl member 32 is normally engaged with the ratchet gear 31. Therefore, it is possible to omit the second lock process and the third lock process. In this manner, by omitting the second lock process and the third lock process as necessary, it is possible to appropriately shorten the time required to maintain a braking force applied to a vehicle.

(1-4) In the electric braking device 10 for a vehicle according to the present embodiment, even if an absolute rotational angle of the ratchet gear 31 is not detected, it is possible to normally engage the pawl member 32 with the ratchet gear 31 by performing the first lock process, the second lock process, and the third lock process in order. Therefore, as the rotational angle detection sensor 101, a sensor which detects a relative rotational angle can be used. Therefore, it is possible to suppress an increase in cost of the apparatus, as compared with the case where a sensor for detecting an absolute rotational angle is used.

The above-described embodiment may be changed to another embodiment to be described below.

Even in the case where the specific rotational angle change amount ΔMka1 which is a rotation amount of the ratchet gear 31 in the release direction R2 by performing the first lock process is larger than the meshing determination change amount ΔMkaTh1, the second lock process and the third lock process may be sequentially performed after the first lock process is finished.

In the above-described embodiment, the end timing of the second lock process is determined based on the value of current Imt flowing to the motor 23 which is being increased. However, the present invention is not limited thereto, and parameters other than the current value Imt may be used to determine the end timing of the second lock process.

For example, the reference rotational angle change amount ΔMka2 may be monitored, and when the reference rotational angle change amount ΔMka2 reaches the specified change amount ΔMkaTh2, the second lock process may be finished. Even in this case, the same effects as in the above embodiment can be obtained.

In the second lock process, as the value of current Imt flowing to the motor 23 increases, a displacement torque which is a torque for rotating the ratchet gear 31 in the braking direction R1 gradually increases. When the displacement torque increases to some extent, the ratchet gear 31 starts to rotate in the braking direction R1. That is, after the ratchet gear 31 starts to rotate in the braking direction R1, it can be said that an increase amount of the displacement torque and the reference rotational angle change amount ΔMka2 are correlated.

Figure 6:
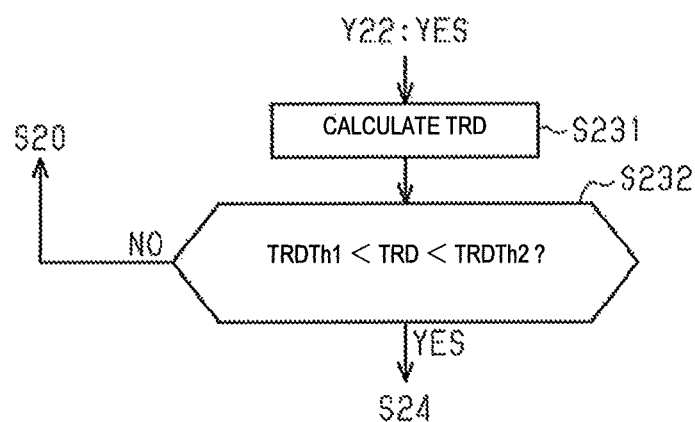
FIG. 6 is a flowchart describing a part of a process routine performed by a control device of an electric braking device for a vehicle according to another embodiment and performed for maintaining a braking force applied to wheels.

Therefore, as shown in FIG. 6, when the electric braking device 10 for a vehicle is provided with a sensor for detecting an output torque from the motor 23, the displacement torque TRD may be calculated based on the output torque detected by the sensor (step S231). Then, it is determined whether or not the displacement torque TRD is a torque larger than the specified torque reference value TRDTh1 and smaller than the regulatable torque reference value TRDTh2 (step S232), and if the displacement torque TRD is equal to or smaller than the specified torque reference value TRDTh (step S232: NO), the processing may proceed to the above-described step S20, and the second lock process may be continued. On the other hand, when the displacement torque TRD is a torque larger than the specified torque reference value TRDTh1 and smaller than the regulatable torque reference value TRDTh2 (step S232: YES), the processing proceeds to the above-described step S24, and the second lock process may be finished. Such a control configuration can be adopted as long as an output torque from the motor 23 can be estimated and calculated even without using a sensor which directly detects the output torque from the motor.

In this case, the specified torque reference value TRDTh1 is preferably set to a minimum displacement torque which can rotate the ratchet gear 31 in the braking direction R1. Further, the regulatable torque reference value TRDTh2 is preferably set to a maximum displacement torque which can restrict that the amount of rotation of the ratchet gear 31 in the braking direction R1 exceeds the interval PH between the respective teeth 311 adjacent to each other in a circumferential direction. As a result, the ratchet gear 31 can be reliably rotated in the braking direction R1 by performing the second lock process. When the ratchet gear 31 starts to rotate in the braking direction R1 as described above, the second lock process can be finished at the timing when the rotational angle Mka of the ratchet gear 31 reaches an angle different from the semi-engaging rotational angle MkaA, that is, at the timing when the pawl member 32 is not semi-engaged with the ratchet gear 31. Therefore, by performing the third lock process, the pawl member 32 can be normally engaged with the ratchet gear 31.

Further, in the second lock process, by controlling driving of the motor 23 based on the magnitude of the displacement torque TRD as described above, even if a detection result by the rotational angle detection sensor 101 is not used, the rotational angle Mka of the ratchet gear 31 can be set to an angle different from the semi-engaging rotational angle MkaA. Then, by performing the third lock process, without using the detection result by the rotational angle detection sensor 101, the pawl member 32 can be normally engaged with the ratchet gear 31.

In the above-described embodiment, the solenoid 33 is energized before the first lock process is performed, and the energization to the solenoid 33 is finished after the third lock process is finished. However, the solenoid 33 may not be energized during the second lock process. In this case, when the second lock process is ended, the solenoid 33 is desirably energized again before starting the third lock process.

In addition, when the solenoid 33 is not energized during the second lock process as described above, the motor 23 may be reversely driven, and the ratchet gear 31 may be rotated in the release direction R2, during the second lock process.

The specified change amount ΔMkaTh2 may be larger than the interval PH between the teeth 311 adjacent to each other in a circumferential direction in the ratchet gear 31 as long as the above-described relational formula (Formula 1) is established. In this case, by substituting a positive value of "1" or more into "N" in the relational formula (Formula 1), the specified change amount ΔMkaTh2 can be appropriately set.

When the brake pads 22 are pressed against the brake disc 20, a reaction force acts on the output shaft 231 of the motor 23. Therefore, when the value of current Imt flowing to the motor 23 is set to "0 (zero)" in this state, the ratchet gear 31 may rotate in the release direction R2 by the reaction force.

In this case, in the first lock process, by setting the current value Imt to "0 (zero)", driving of the motor 23 which has generated the torque for displacing the ratchet gear 31 in the braking direction R1 may be stopped.

In the third lock process, the current value Imt may be set to "0 (zero)" without reversely driving the motor 23. As a result, the ratchet gear 31 rotates in the release direction R2 by the reaction force, and the pawl member 32 can be normally engaged with the ratchet gear 31.

The number of the teeth 311 provided in the ratchet gear 31 may be one.

As a second drive source, a drive source other than a solenoid (for example, a direct-acting motor or a piezoelectric element) may be used as long as the pawl member 32 can move forward and backward.

In the above-described embodiment, the displacement member is fixed to the output shaft 231 of the motor 23. However, as long as the member is displaceable in accordance with driving of the motor 23, the displacement member may be fixed to another member other than the output shaft 231. For example, the displacement member may be fixed to the shaft member 26, or the displacement member may be fixed to the piston 28. Further, when the displacement member is fixed to the piston 28 as described above, the first drive source may be a drive source other than the motor which rotates the output shaft. As such another drive source, for example, an electric motor capable of position adjustment in forward and backward directions can be used. When the displacement member is fixed to a component which directly moves as described above, a movement direction of the component corresponds to a specified direction.

The brake actuator 12 provided for each wheel 11 may include a wheel cylinder. In this case, a pump which operates to adjust a fluid pressure in the wheel cylinder may function as the first drive source.

Second Embodiment

Hereinafter, a second embodiment embodying an electric braking device for a vehicle and a braking-force-maintaining device for a vehicle will be described with reference to FIGS. 7 and 8. In the following description, portions different from the first embodiment will be mainly described, and the same member configurations as in the first embodiment are denoted by the same reference signs, and a redundant description will be omitted.

A rotational angle detection sensor 101 provided in an electric braking device 10 for a vehicle according to the present embodiment can detect an absolute rotational angle Mka of a ratchet gear 31. Therefore, before energizing a solenoid 33 to press a pawl member 32 against the ratchet gear 31, it can be determined whether or not the rotational angle Mka of the ratchet gear 31 is substantially equal to a semi-engaging rotational angle MkaA.

Therefore, with reference to FIG. 7, operations of the electric braking device 10 for a vehicle according to the present embodiment will be described.

Figure 7A:
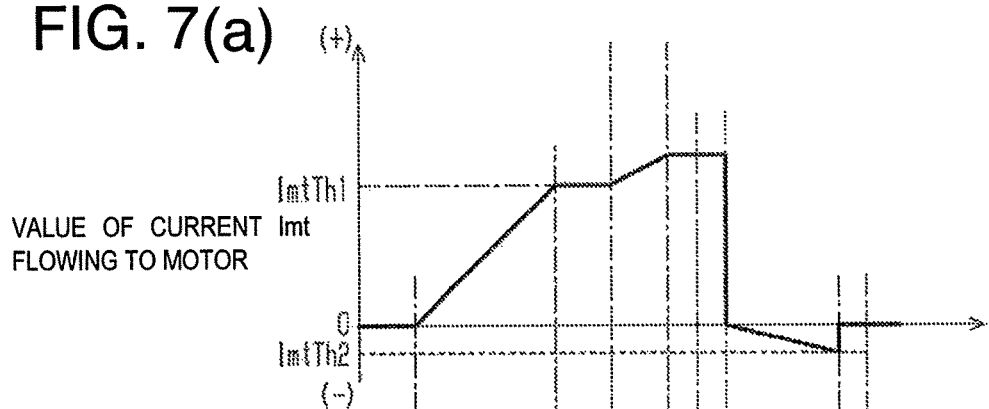
FIG. 7(a) shows transition of a value of current flowing to a first driving source.
Figure 7B:
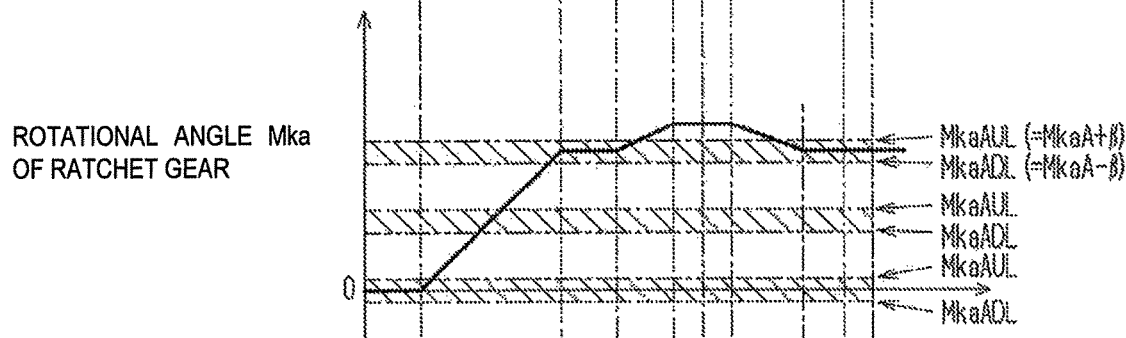
FIG. 7(b) shows transition of a position of a displacement member in a specified direction.
Figure 7C:
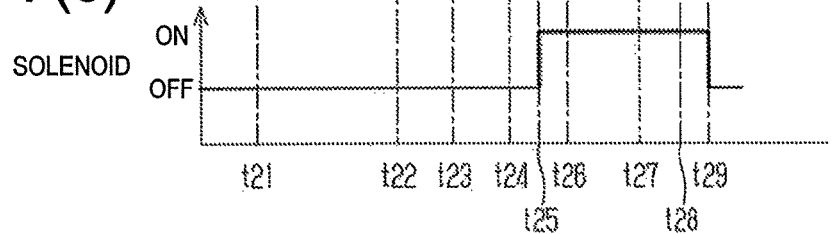
FIG. 7(c) shows transition of a driving state of a second driving source.

As shown in FIGS. 7(a), 7(b), and 7(c), when a parking switch 111 is turned on at a first timing t21, a motor 23 is positively driven such that a braking force with a magnitude capable of maintaining a vehicle in a stop state is applied to a wheel 11. Then, at a second timing t22, a braking force applied to the wheel 11 becomes equal to a required braking force BPT, and when a value of current Imt flowing to the motor 23 becomes equal to a required current value ImtTh1 correlated with the required braking force BPT, the current value Imt is maintained.

Then, it is determined whether or not a rotational angle Mka of the ratchet gear 31 detected by the rotational angle detection sensor 101 is substantially equal to a semi-engaging rotational angle MkaA. For example, a difference (=MkaA−β) obtained by subtracting an offset value β from the semi-engaging rotational angle MkaA is set as a determination lower limit value MkaADL, and a sum (=MkaA+β) obtained by adding the offset value β to the semi-engaging rotational angle MkaA is set as a determination upper limit value MkaAUL. In this case, when the rotational angle Mka is larger than the determination lower limit value MkaADL and smaller than the determination upper limit value MkaAUL, it can be determined that the rotational angle Mka is substantially equal to the semi-engaging rotational angle MkaA.

In FIG. 7(b), when the rotational angle Mka is included in the hatched area, it can be regarded that the rotational angle Mka of the ratchet gear 31 is substantially equal to the semi-engaging rotational angle MkaA. That is, in the example shown in FIG. 7, when the value of current Imt flowing to the motor 23 is equal to the required current value ImtTh1, the rotational angle Mka is substantially equal to the semi-engaging rotational angle MkaA.

Therefore, in the electric braking device 10 for a vehicle according to the present embodiment, an engagement correction process is performed. That is, in the engagement correction process, the value of current Imt flowing to the motor 23 is increased from the required current value ImtTh1, and therefore the ratchet gear 31 is rotated in a braking direction R1. As a result, the rotational angle Mka of the ratchet gear 31 becomes larger than the rotational angle at a third timing t23. Then, the current value Imt is maintained at a fourth timing t24, at which the rotational angle Mka is larger than the determination upper limit value MkaAUL. As a result, the rotational angle Mka is maintained at an angle different from the semi-engaging rotational angle MkaA.

Then, at a subsequent fifth timing t25, energization to the solenoid 33 is started, and accordingly the pawl member 32 is pressed against the ratchet gear 31, and the engagement correction process is finished. In this case, the pawl member 32 is in contact with a first tooth surface 31A of a tooth 311 of the ratchet gear 31 (refer to FIG. 4(c)). Then, in the electric braking device 10 for a vehicle according to the present embodiment, the same process as the third lock process is performed from the subsequent sixth timing t26.

That is, the value of current Imt flowing to the motor 23 is set to "0 (zero)" and then gradually decreased from "0 (zero)". As a result, the motor 23 is reversely driven, and the ratchet gear 31 is rotated in the release direction R2. Then, a second tooth surface 31B of the tooth 311 of the ratchet gear 31 gradually approaches the meshing surface 32A of the pawl member 32. Then, at a seventh timing t27 at which the current value Imt is decreasing, the meshing surface 32A of the pawl member 32 is in surface contact with the second tooth surface 31B of the tooth 311 of the ratchet gear 31, and the pawl member 32 is normally engaged with the ratchet gear 31. When the current value Imt reaches a second determination current value ImtTh2 at a subsequent eighth timing t28, the current value Imt is set to "0 (zero)", and reverse driving of the motor 23 is stopped. Then, at a subsequent ninth timing t29, energization to the solenoid 33 is finished, and a series of processing for maintaining the braking force to the wheel 11 is finished.

When it is determined that the rotational angle Mka of the ratchet gear 31 is not the semi-engaging rotational angle MkaA at the third timing t23, the value of current Imt flowing to the motor 23 is not further increased, and the energization to the solenoid 33 is started.

Next, with reference to a flowchart shown in FIG. 8, a process routine performed by a control device 13 to maintain the braking force applied to the wheel 11 will be described. This process routine is performed when the parking switch 111 is turned on, and the value of current Imt flowing to the motor 23 reaches the required current value ImtTh1.

Figure 8:
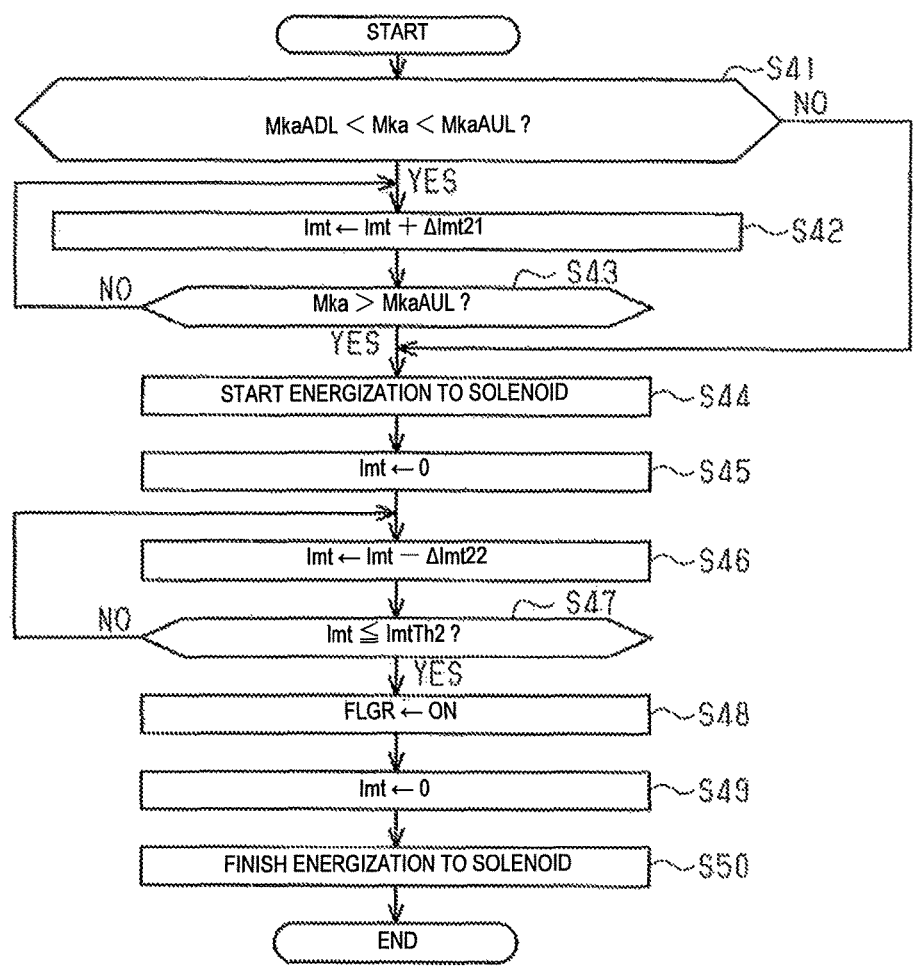
FIG. 8 is a flowchart describing a process routine performed by a control device of the electric braking device for a vehicle and performed for maintaining a braking force applied to wheels.

As shown in FIG. 8, in this process routine, the control device 13 acquires the current rotational angle Mka of the ratchet gear 31 detected by the rotational angle detection sensor 101 and determines whether or not this rotational angle Mka is equal to the semi-engaging rotational angle MkaA (step S41). When it is determined that the rotational angle Mka is different from the semi-engaging rotational angle MkaA (step S41: NO), the control device 13 shifts the processing to step S44 to be described later.

On the other hand, when it is determined that the rotational angle Mka of the ratchet gear 31 is substantially equal to the semi-engaging rotational angle MkaA (step S41: YES), the control device 13 performs an engagement correction process. That is, the control device 13 increases the value of current Imt flowing to the motor 23 by the twenty-first change value ΔImt21 (step S42). The twenty-first change value ΔImt21 is a value larger than "0 (zero)". Therefore, during the engagement correction process, the current value Imt is increased at a speed corresponding to the twenty-first change value ΔImt21. Subsequently, the control device 13 acquires the current rotational angle Mka of the ratchet gear 31 detected by the rotational angle detection sensor 101 and determines whether or not the rotational angle Mka is larger than the determination upper limit value MkaAUL (step S43).

When the rotational angle Mka of the ratchet gear 31 is equal to or lower than the determination upper limit value MkaAUL (step S43: NO), the control device 13 shifts the processing to the above-described step S42 and continues increasing the value of current Imt flowing to the motor 23. On the other hand, when the rotational angle Mka is larger than the determination upper limit value MkaAUL (step S43: YES), the control device 13 shifts the processing to the next step S44.

In step S44, the control device 13 starts energizing the solenoid 33. Subsequently, the control device 13 sets the value of current Imt flowing to the motor 23 to "0 (zero)" (step S45) and finishes performing the engagement correction process.

That is, the control device 13 decreases the value of current Imt flowing to the motor 23 by the twenty-second change value ΔImt22 (step S46). Since the twenty-second change value ΔImt22 is a value larger than "0 (zero)", the current value Imt is decreased at a speed corresponding to the twenty-second change value ΔImt22. Subsequently, the control device 13 determines whether or not the current value Imt is equal to or smaller than the second determination current value ImtTh2 (step S47). When the current value Imt is larger than the second determination current value ImtTh2 (step S47: NO), the control device 13 shifts the processing to the above-described step S46 and continues decreasing the current value Imt. On the other hand, when the current value Imt is equal to or smaller than the second determination current value ImtTh2 (step S47: YES), the control device 13 sets a lock complete flag FLGR to ON (step S48). Subsequently, the control device 13 sets the current value Imt to "0 (zero)" (step S49) and then finishes energization to the solenoid 33 (step S50). Then, the control device 13 finishes this process routine.

According to the above-described configuration and operation, the following effects can be obtained.

(2-1) When a braking force applied to a vehicle is maintained, if the rotational angle Mka of the ratchet gear 31 is substantially equal to the semi-engaging rotational angle MkaA, before the pawl member 32 is pressed against the ratchet gear 31, the engagement correction process is performed. Then, the rotational angle Mka of the ratchet gear 31 is set to an angle different from the semi-engaging rotational angle MkaA, and the pawl member 32 is pressed against the ratchet gear 31. Therefore, when the pawl member 32 is pressed against the ratchet gear 31, it is possible to suppress the occurrence of an event that a tip 321 of the pawl member 32 is caught on a tip of the tooth 311 of the ratchet gear 31. In this state, by rotating the ratchet gear 31 in the release direction R2 by reverse driving of the motor 23, the meshing surface 32A of the pawl member 32 comes into surface contact with the second tooth surface 31B of the tooth 311 of the ratchet gear 31. That is, the ratchet gear 31 can be normally engaged with the pawl member 32. Therefore, by suppressing the occurrence of an event that the pawl member 32 is semi-engaged with the ratchet gear 31, it is possible to suppress a decrease in a braking force applied to a wheel.

(2-2) As the rotational angle detection sensor 101, a sensor capable of detecting the absolute rotational angle Mka of the ratchet gear 31 is used. By monitoring the rotational angle Mka detected by the rotational angle detection sensor 101, it is possible to appropriately determine whether or not the execution of the engagement correction process is necessary.

(2-3) Even during the engagement correction process, by monitoring the rotational angle Mka of the ratchet gear 31 detected by the rotational angle detection sensor 101, the ratchet gear 31 can be rotated until the rotational angle Mka becomes an angle different from the semi-engaging rotational angle MkaA (2-4) In the electric braking device 10 for a vehicle according to the present embodiment, the rotational angle Mka of the ratchet gear 31 differs from the semi-engaging rotational angle MkaA by positive driving of the motor 23 by performing the engagement correction process. Therefore, since the motor 23 is not reversely driven, a decrease in the braking force applied to the vehicle associated with the engagement correction process can be suppressed.

The above-described embodiment may be changed to another embodiment to be described below.

In the engagement correction process performed when vehicle stop can be maintained even if the motor 23 is reversely driven, by rotating the ratchet gear 31 in the release direction R2 by reverse driving of the motor 23, the rotational angle Mka of the ratchet gear 31 may be made different from the semi-engaging rotational angle MkaA. In this case, when the rotational angle Mka becomes smaller than the determination lower limit value MkaADL, driving of the motor 23 is stopped.

When the brake pads 22 are pressed against the brake disc 20, a reaction force acts on the output shaft 231 of the motor 23. Therefore, when the value of current Imt flowing to the motor 23 is set to "0 (zero)" in this state, the ratchet gear 31 may rotate in the release direction R2 by the reaction force. In this case, in the state in which the pawl member 32 is pressed against the ratchet gear 31, the current value Imt may be set to "0 (zero)" without reversely driving the motor 23. As a result, the ratchet gear 31 rotates in the release direction R2 by the reaction force, and the pawl member 32 can be normally engaged with the ratchet gear 31.

When a sensor for detecting a position in an axial direction of the pawl member 32 is provided in the electric braking device 10 for a vehicle, a sensor which cannot detect the absolute rotational angle Mka of the ratchet gear 31 may be used as the rotational angle detection sensor 101. In this case, when the value of current Imt flowing to the motor 23 becomes equal to the required current value ImtTh1, energization to the solenoid 33 is started, and the current position of the pawl member 32 in the axial direction may be detected by the sensor. When it can be determined from the detected position in the axial direction of the pawl member 32 that the tip 321 of the pawl member 32 is caught on the tip of the tooth 311 and that the pawl member 32 is semi-engaged with the ratchet gear 31, the engagement correction process may be performed on condition that the energization to the solenoid 33 is stopped.

In this case, the number of the teeth 311 provided in the ratchet gear 31 may be one.

As a second drive source, a drive source other than a solenoid (for example, a direct-acting motor or a piezoelectric element) may be used as long as the pawl member 32 can move forward and backward.

In the above-described embodiment, the displacement member is fixed to the output shaft 231 of the motor 23. However, the displacement member may be fixed to another member other than the output shaft 231 as long as the member is displaceable in accordance with driving of the motor 23. For example, the displacement member may be fixed to the shaft member 26, or the displacement member may be fixed to the piston 28. Further, when the displacement member is fixed to the piston 28 as described above, the first drive source may be a drive source other than the motor which rotates the output shaft. As such another drive source, for example, an electric motor capable of position adjustment in forward and backward directions can be used. When the displacement member is fixed to a component which directly moves as described above, a movement direction of the component corresponds to a specified direction.

The brake actuator 12 provided for each wheel 11 may include a wheel cylinder. In this case, a pump which operates to adjust a fluid pressure in the wheel cylinder may function as the first drive source.

Third Embodiment

Next, a third embodiment embodying an electric braking device for a vehicle and a braking-force-maintaining device for a vehicle will be described with reference to FIGS. 9 and 10. In the following description, portions different from the first and second embodiments will be mainly described, and the same member configurations as in the first and second embodiments are denoted by the same reference signs, and a redundant description will be omitted.

A rotational angle detection sensor 101 provided in an electric braking device 10 for a vehicle according to the present embodiment can detect an absolute rotational angle Mka of a ratchet gear 31. Therefore, when the braking force applied to a wheel 11 reaches a required braking force BPT, it can be determined whether or not the rotational angle Mka of the ratchet gear 31 is substantially equal to a semi-engaging rotational angle MkaA.

Therefore, with reference to FIG. 9, operations of the electric braking device 10 for a vehicle according to the present embodiment will be described.

Figure 9A:
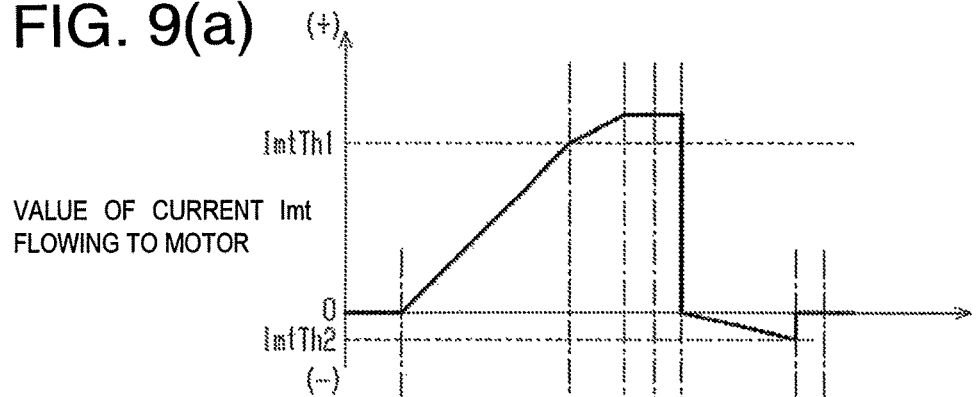
FIG. 9(a) shows transition of a value of current flowing to a first driving source.
Figure 9B:
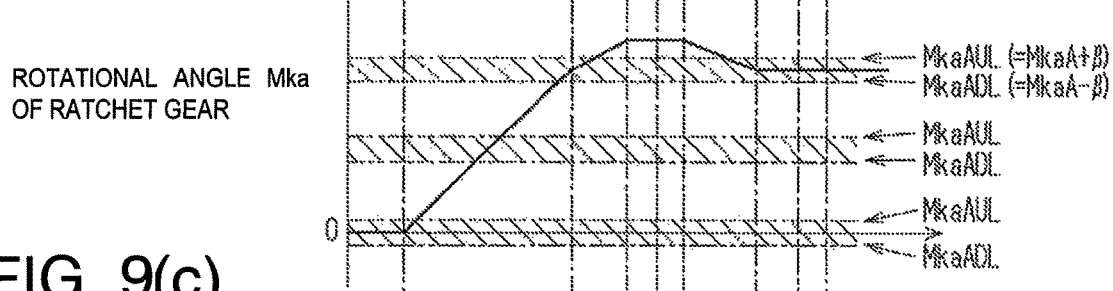
FIG. 9(b) shows transition of a position of a displacement member in a specified direction.
Figure 9C:
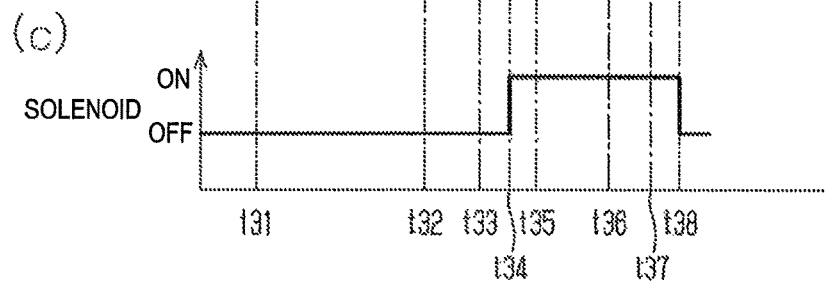
FIG. 9(c) shows transition of a driving state of a second driving source.

As shown in FIGS. 9(*a*), 9(*b*), and 9(*c*), when a parking switch 111 is turned on at a first timing t31, the motor 23 is positively driven such that a braking force with a magnitude capable of maintaining a vehicle in a stop state is applied to the wheel 11. Then, at a second timing t32, a value of current Imt flowing to the motor 23 reaches a required current value ImtTh1, and the braking force applied to the wheel 11 becomes equal to the required braking force BPT.

At this time, when the rotational angle Mka of the ratchet gear 31 is substantially equal to the semi-engaging rotational angle MkaA, the value of current Imt flowing to the motor 23 is not maintained, and the current value Imt is increased. That is, the current value Imt is continuously increased even after the second timing t32 at which the current value Imt reaches the required current value ImtTh1. In the example shown in FIG. 9, an increase speed of the current value Imt after the second timing t32 is smaller than an increase speed of the current value Imt before the second timing t32.

A determination method as in the second embodiment can be used as a method for determining whether or not the rotational angle Mka of the ratchet gear 31 is substantially equal to the semi-engagement rotational angle MkaA. That is, when the rotational angle Mka at the second timing t32 is larger than a determination lower limit value MkaADL (=MkaA−β) and smaller than a determination upper limit value MkaAUL (=MkaA+β), it can be determined that the rotational angle Mka is substantially equal to the semi-engaging rotational angle MkaA.

Then, at a third timing t33 during which the value of current Imt flowing to the motor 23 is increasing, the rotational angle Mka of the ratchet gear 31 becomes larger than the determination upper limit value MkaAUL. In this case, since it can be determined that the rotational angle Mka is an angle different from the semi-engaging rotational angle MkaA, the current value Imt is maintained at the third timing t33.

Then, at the subsequent fourth timing t34, the pawl member 32 is pressed against the ratchet gear 31 by starting energization to the solenoid 33. In this case, the pawl member 32 is in contact with a first tooth surface 31A of the tooth 311 of the ratchet gear 31. Then, in the electric braking device 10 for a vehicle according to the present embodiment, the same process as the third lock process is performed from the subsequent fifth timing t35.

That is, the value of current Imt flowing to the motor 23 is set to "0 (zero)" and then gradually decreased from "0 (zero)". As a result, the motor 23 is reversely driven, and the ratchet gear 31 is rotated in the release direction R2. Then, a second tooth surface 31B of the tooth 311 of the ratchet gear 31 gradually approaches the meshing surface 32A of the pawl member 32. Then, at a sixth timing t36 at which the current value Imt is decreasing, the meshing surface 32A of the pawl member 32 is in surface contact with the second tooth surface 31B of the tooth 311 of the ratchet gear 31, and the pawl member 32 is normally engaged with the ratchet gear 31. When the current value Imt reaches a second determination current value ImtTh2 at a subsequent seventh timing t37, the current value Imt is set to "0 (zero)", and reverse driving of the motor 23 is stopped. Then, at a subsequent eighth timing t38, energization to the solenoid 33 is finished, and a series of processing for maintaining the braking force to the wheel 11 is finished.

The rotational angle Mka of the ratchet gear 31 at the second timing t32 at which the value of current Imt flowing to the motor 23 reaches the required current value ImtTh1 may be an angle different from the semi-engaging rotational angle MkaA. In this case, the current value Imt is held when the current value Imt reaches the required current value ImtTh1, and energization to the solenoid 33 is started in this state.

Next, with reference to a flowchart shown in FIG. 10, a process routine performed by a control device 13 when maintaining the braking force applied to the wheel 11 will be described. This process routine is performed when the parking switch 111 is turned on, and the value of current Imt flowing to the motor 23 is increased toward the required current value ImtTh1.

Figure 10:
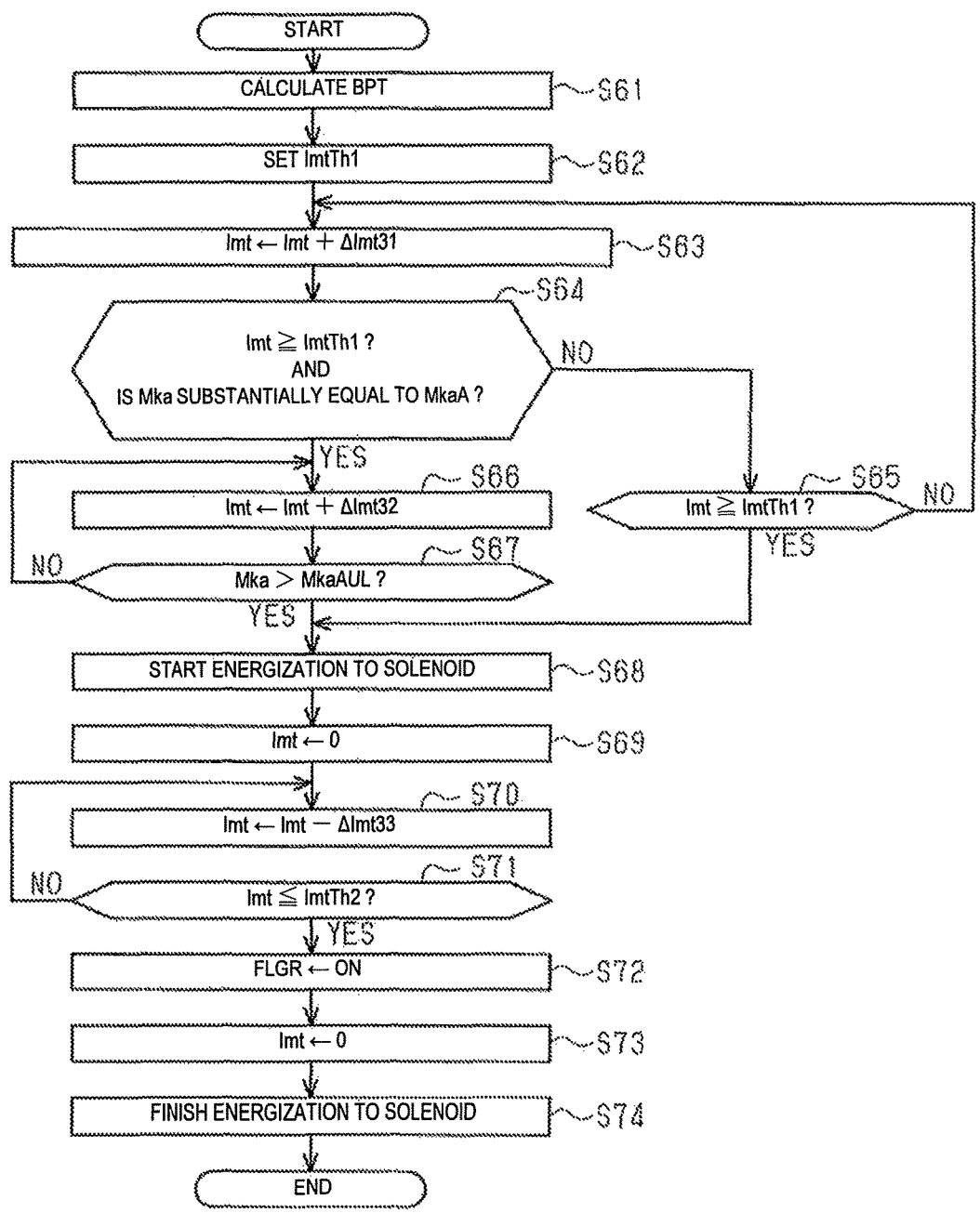
FIG. 10 is a flowchart describing a process routine performed by a control device of the electric braking device for a vehicle and performed for maintaining a braking force applied to wheels after the braking force increases.
Figure 11:
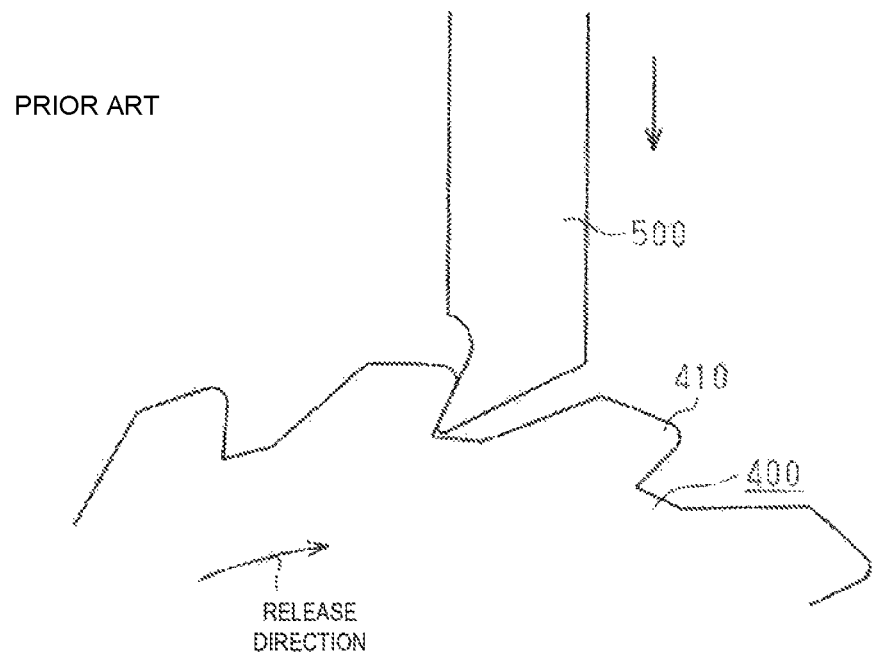
FIG. 11 is a schematic view showing a state in which a pawl member normally engages with a ratchet gear in a conventional electric braking device for a vehicle.
Figure 12:
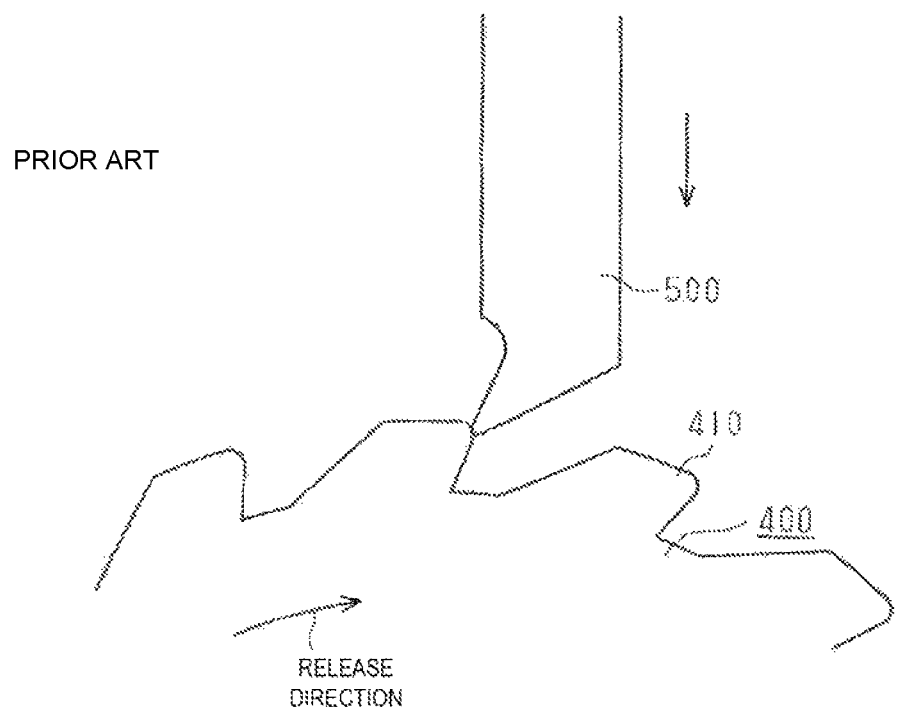
FIG. 12 is a schematic view showing a state in which a pawl member is semi-engaged with a ratchet gear in a conventional electric braking device for a vehicle.

As shown in FIG. 10, in this process routine, the control device 13 calculates the required braking force BPT based on an inclination angle of a road surface on which a vehicle is located and an output from an engine (step S61). Subsequently, the control device 13 sets the required current value ImtTh1 based on the calculated required braking force BPT (step S62). For example, the required current value ImtTh1 is set to a larger value as the required braking force BPT becomes large. Then, the control device 13 increases the value of current Imt flowing to the motor 23 by the thirty-first change value ΔImt31 (step S63). Since the thirty-first change value ΔImt31 is a value larger than "0 (zero)", the current value Imt is increased at a speed corresponding to the thirty-first change value ΔImt31.

Subsequently, the control device 13 determines whether or not all of the followings conditions are satisfied (step S64): the value of current Imt flowing to the motor 23 is equal to or greater than the required current value ImtTh1 (Condition 1), and the rotational angle Mka of the ratchet gear 31 is substantially equal to the semi-engaged rotational angle MkaA (Condition 2). When at least one of the condition 1 and the condition 2 is not established (step S64: NO), the control device 13 determines whether or not the above condition 1 is satisfied (step S65). When the current value Imt is less than the required current value ImtTh1 (step S65: NO), the control device 13 shifts the processing to the above-described step S63 and continues increasing the current value Imt. On the other hand, when the current value Imt is equal to or greater than the required current value ImtTh1 (step S65: YES), the control device 13 shifts the processing to step S68 to be described later and maintains the current value Imt.

On the other hand, in step S64, when both the above-described conditions 1 and 2 are satisfied (YES), the control device 13 increases the value of current Imt flowing to the motor 23 by the thirty-second change value ΔImt32 (step S66). A thirty-second change value ΔImt32 is a value larger than "0 (zero)", and for example, smaller than the thirty-first change value ΔImt31. Therefore, the current value Imt is increased at a speed corresponding to the thirty-second change value ΔImt32. Subsequently, the control device 13 acquires the current rotational angle Mka of the ratchet gear 31 detected by the rotational angle detection sensor 101 and determines whether or not the rotational angle Mka is larger than the determination upper limit value MkaAUL (step S67).

When the rotational angle Mka of the ratchet gear 31 is equal to or lower than the determination upper limit value MkaAUL (step S67: NO), the control device 13 shifts the processing to the above-described step S66 and continues increasing the value of current Imt flowing to the motor 23. On the other hand, when the rotational angle Mka is larger than the determination upper limit value MkaAUL (step S67: YES), the control device 13 shifts the processing to the next step S68 and maintains the current value Imt.

In step S68, the control device 13 starts energizing the solenoid 33. Subsequently, the control device 13 sets the value of current Imt flowing to the motor 23 to "0 (zero)" (step S69). Then, the control device 13 decreases the current value Imt by a thirty-third change value ΔImt33 (step S70). Since the thirty-third change value ΔImt33 is a value larger than "0 (zero)", the current value Imt is decreased at a speed corresponding to the thirty-third change value ΔImt33.

Subsequently, the control device 13 determines whether or not the value of current Imt flowing to the motor 23 is equal to or less than the second determination current value ImtTh2 (step S71). When the current value Imt is larger than the second determination current value ImtTh2 (step S71: NO), the control device 13 shifts the processing to the above-described step S70 and continues decreasing the current value Imt. On the other hand, when the current value Imt is equal to or less than the second determination current value ImtTh2 (step $71: YES), the control device 13 sets a lock complete flag FLGR to ON (step S72). Subsequently, the control device 13 sets the current value Imt to "0 (zero)" (step S73) and then finishes energization to the solenoid 33 (step S74). Then, the control device 13 finishes this process routine.

According to the above-described configuration and operation, the following effects can be obtained.

(3-1) The pawl member 32 is pressed against the ratchet gear 31 in a state in which the rotational angle Mka of the ratchet gear 31 is set to an angle different from the semi-engaging rotational angle MkaA. Therefore, when the braking force is maintained by pressing the pawl member 32 against the ratchet gear 31, it is possible to suppress the occurrence of an event that the tip 321 of the pawl member 32 is caught on a tip of the tooth 311 of the ratchet gear 31. In this state, by rotating the ratchet gear 31 in the release direction R2 by reverse driving of the motor 23, the meshing surface 32A of the pawl member 32 comes into surface contact with the second tooth surface 31B of the tooth 311 of the ratchet gear 31. That is, the ratchet gear 31 can be normally engaged with the pawl member 32. Therefore, by suppressing the occurrence of an event that the pawl member 32 is semi-engaged with the ratchet gear 31, it is possible to suppress a decrease in a braking force applied to a wheel.

(3-2) As the rotational angle detection sensor 101, a sensor capable of detecting the absolute rotational angle Mka of the ratchet gear 31 is used. By monitoring the rotational angle Mka detected by the rotational angle detection sensor 101 as described above, it can be appropriately determined whether or not the rotational angle Mka at the time when the value of current Imt flowing to the motor 23 reaches the required current value ImtTh1 is substantially equal to the semi-engaging rotational angle MkaA.

(3-3) When the value of current Imt flowing to the motor 23 continues increasing even after exceeding the required current value ImtTh1, the timing at which the increase of the current value Imt is stopped can be appropriately set by monitoring the rotational angle Mka of the ratchet gear 31 detected by the rotational angle detection sensor 101.

The above-described embodiment may be changed to another embodiment to be described below.

As long as both the following conditions can be satisfied: vehicle stop is maintained, and the rotational angle Mka of the ratchet gear 31 is an angle different from the semi-engaging rotational angle MkaA, the current value Imt may be maintained in a state in which the value of current Imt flowing to the motor 23 is smaller than the required current value ImtTh1.

In the above-described embodiment, when the rotational angle Mka of the ratchet gear 31 at the time when the value of current Imt flowing to the motor 23 reaches the required current value ImtTh1 is substantially equal to the semi-engaging rotational angle MkaA, the increase in the current value Imt is continued. However, when the motor 23 is positively driven to apply a braking force to a wheel, or before starting the positive driving of the motor 23, a rotational angle of the ratchet gear 31 can be estimated at the time when the value of current Imt flowing to the motor 23 reaches the required current value ImtTh1. When the estimated value of the rotational angle is substantially equal to the semi-engaging rotational angle MkaA, the increase in the current value Imt may be continued even when the current value Imt reaches the required current value ImtTh1.

When the estimated value of the rotational angle is substantially equal to the semi-engaging rotational angle MkaA, the required current value ImtTh1 may be corrected to be increased, and the value of current Imt flowing to the motor 23 may be increased to the corrected requested current value ImtTh1.

The thirty-second change value ΔImt32 only has to be a positive value, may be equal to the thirty-first change value ΔImt31, or may be larger than the thirty-first change value ΔImt31.

When the brake pads 22 are pressed against the brake disc 20, a reaction force acts on the output shaft 231 of the motor 23. Therefore, when the value of current Imt flowing to the motor 23 is set to "0 (zero)" in this state, the ratchet gear 31 may rotate in the release direction R2 by the reaction force. In this case, in the state in which the pawl member 32 is pressed against the ratchet gear 31, the current value Imt may be set to "0 (zero)" without reversely driving the motor 23. As a result, the ratchet gear 31 rotates in the release direction R2 by the reaction force, and the pawl member 32 can be normally engaged with the ratchet gear 31.

The number of the teeth 311 provided in the ratchet gear 31 may be one.

As a second drive source, a drive source other than a solenoid (for example, a direct-acting motor or a piezo-electric element) may be used as long as the pawl member 32 can move forward and backward.

In the above-described embodiment, the displacement member is fixed to the output shaft 231 of the motor 23. However, the displacement member may be fixed to another member other than the output shaft 231 as long as the member is displaceable in accordance with driving of the motor 23. For example, the displacement member may be fixed to the shaft member 26, or the displacement member may be fixed to the piston 28. Further, when the displacement member is fixed to the piston 28 as described above, the first drive source may be a drive source other than the motor which rotates the output shaft. As such another drive source, for example, an electric motor capable of position adjustment in forward and backward directions can be used. When the displacement member is fixed to a component which directly moves as described above, a movement direction of the component corresponds to a specified direction.

The brake actuator 12 provided for each wheel 11 may include a wheel cylinder. In this case, a pump which operates to adjust a fluid pressure in the wheel cylinder may function as the first drive source.

The invention claimed is:

1. A braking-force-maintaining device for a vehicle, configured to maintain a braking force applied to a wheel by maintaining a force pressing a friction member against a rotor which rotates integrally with the wheel, the braking-force-maintaining device, comprising:

a displacement member which includes at least one tooth and in which the force pressing the friction member against the rotor increases when the displacement member is displaced in a braking direction, and the pressing force decreases when the displacement member is displaced in a release direction;

a pawl member configured to move forward and backward in a direction toward or away from the displacement member and regulate displacement of the displacement member in the release direction when the pawl member is meshed with the at least one tooth; and a control device configured to control a first driving source which is a driving source of the displacement member and a second driving source which is a driving source of the pawl member, wherein a semi-engaging position where a position of the displacement member when a tip of the pawl member is in contact with a tip of the at least one tooth, the control device performs:

a first lock process configured to generate a torque to displace the displacement member in the release direction of the first driving source, or configured to stop driving the first driving source generating a torque to displace the displacement member in the braking direction, when the pawl member is pressed against the displacement member by driving the second drive source;

a second lock process performed after end of the first lock process and configured to displace the displacement member in the braking direction or the release direction by driving the first driving source and set a position of the displacement member to a position different from the semi-engaging position; and a third lock process performed after end of the second lock process and configured to displace the displacement member in the release direction when the pawl member is pressed against the displacement member by driving the second driving source.

2. The braking-force-maintaining device for a vehicle according to claim 1, comprising:

a position detector configured to detect a position of the displacement member, wherein the at least one tooth of the displacement member comprises a plurality of the teeth, a reference position, the reference position being a position of the displacement member when the execution of the first lock process is finished, in the second lock process, the control device is configured to displace the displacement member from the reference position by driving the first driving source and stops driving the first driving source when a displacement amount of the displacement member from the reference position reaches a specified displacement amount, and wherein the specified displacement amount is denoted by "$\Delta MkaTh2$", an interval between teeth adjacent to each other of the plurality of teeth is denoted by "$PH$", "$N$" is a positive integer of 0 (zero) or larger, and "$M$" is a value larger than 0 (zero) and less than "1", the specified displacement amount can be expressed by a relational formula described below:

$$\Delta MkaTh2 = (N+M) \times PH.$$

3. The braking-force-maintaining device for a vehicle according to claim 1, wherein the pawl member is configured to allow the displacement of the displacement member in the braking direction when the pawl member is meshed with the at least one tooth of the displacement member, the at least one tooth of the displacement member comprising a plurality of the teeth, in the second lock process, when the pawl member is pressed against the displacement member by driving the second driving source, the control device is configured to set a position of the displacement member to a position different from the semi-engaging position, by displacing the displacement member in the braking direction by driving the first driving source, and a displacement torque, the displacement torque being a torque to displace the displacement member in the braking direction by driving the first driving source, a specified torque reference value, the specified torque reference value being a minimum displacement torque capable of displacing the displacement member in the braking direction, and a regulatable torque reference value, the regulatable torque reference value being a maximum displacement torque capable of regulating that a displacement amount of the displacement member in the braking direction exceeds an interval of teeth adjacent to each other of the plurality of teeth, in the second lock process, the control device is configured to set the displacement torque to a torque larger than the specified torque reference value and smaller than the regulatable torque reference value by driving the first driving source.

4. The braking-force-maintaining device for a vehicle according to claim 1, comprising:

a position detector configured to detect a position of the displacement member, a displacement member position, the displacement member position being a position of the displacement member where the pawl member is pressed against the displacement member by driving the second driving source prior to execution of the first lock process, the control device does not perform the second lock process and the third lock process when a displacement amount of the displacement member from the displacement member position in the release direction, associated with the execution of the first lock process is larger than a meshing determination displacement amount.

5. The braking-force-maintaining device according to claim 1, wherein the control device is configured to perform the second lock process when determining that the pawl member regulates displacement of the displacement member in the release direction by performing the first lock process.

6. An electric braking device for a vehicle, comprising:

a rotor configured to integrally rotate with a wheel;

a friction member configured to be pressed against the rotor; and the braking-force-maintaining device for a vehicle according to claim 1, wherein the first driving source is a motor, the motor is drivingly connected to the friction member, and a braking force in accordance with a force pressing the friction member against the rotor is applied to the wheel.

7. A braking-force-maintaining device for a vehicle, configured to maintain a braking force applied to a wheel by maintaining a force pressing a friction member against a rotor which rotates integrally with the wheel, the braking-force-maintaining device, comprising:

a displacement member which includes at least one tooth and in which the force pressing the friction member against the rotor increases when the displacement member is displaced in a braking direction, and the pressing force decreases when the displacement member is displaced in a release direction;

a pawl member configured to move forward and backward in a direction toward or away from the displacement member and regulate displacement of the displacement member in the release direction when the pawl member is meshed with the at least one tooth; and a control device configured to control a first driving source which is a driving source of the displacement member and a second driving source which is a driving source of the pawl member, wherein a semi-engaging position, the semi-engaging position being a position of the displacement member when a tip of the pawl member is in contact with a tip of the at least one tooth, when a braking force applied to the wheel is maintained by engaging the pawl member with the displacement member, the control device is configured to:
 determine whether the displacement member is positioned at the semi-engaging position, and
 perform an engagement correction processing when the displacement member is positioned at the semi-engaging position, the displacement member is displaced in the braking direction or the release direction by driving the first driving source, and the pawl member is pressed against the displacement member by driving the second driving source on condition that a position of the displacement member is set to a position different from the semi-engaging position.

8. The braking-force-maintaining device for a vehicle according to claim 6, comprising:

a position detector configured to detect a position of the displacement member, wherein the control device is configure to determine whether the displacement member is positioned at the semi-engaging position based on a position of the displacement member detected by the position detector when a braking force applied to the wheel is maintained by engaging the pawl member with the displacement member.

9. The braking-force-maintaining device for a vehicle according to claim 8, wherein, in the engagement correction process, the control device causes the displacement member to displace by driving the first driving source such that a position of the displacement member detected by the position detector becomes a position different from the semi-engaging position.

10. An electric braking device for a vehicle, comprising:
a rotor configured to integrally rotate with a wheel;
a friction member configured to be pressed against the rotor; and
the braking-force-maintaining device for a vehicle according to claim 7,
wherein the first driving source is a motor, the motor is drivingly connected to the friction member, and
a braking force in accordance with a force pressing the friction member against the rotor is applied to the wheel.

11. A braking-force-maintaining device for a vehicle, configured to maintain a braking force applied to a wheel by maintaining a force pressing a friction member against a rotor which rotates integrally with the wheel, the braking-force-maintaining device, comprising:

a displacement member which includes at least one tooth and in which the force pressing the friction member against the rotor increases when the displacement member is displaced in a braking direction, and the pressing force decreases when the displacement member is displaced in a release direction;

a pawl member configured to move forward and backward in a direction toward or away from the displacement member and regulate displacement of the displacement member in the release direction when the pawl member is meshed with the at least one tooth;

a position detector configured to detect a position of the displacement member; and a control device configured to control a first driving source which is a driving source of the displacement member and a second driving source which is a driving source of the pawl member, wherein a semi-engaging position, the semi-engaging position being a position of the displacement member when a tip of the pawl member is in contact with a tip of the at least one tooth, the control device configured to press the pawl member against the displacement member by driving the second driving source on condition that a position of the displacement member detected by the position detector is set to a position different from the semi-engaging position by driving the first driving source when a braking force applied to the wheel is equal to or greater than a required braking force.

12. An electric braking device for a vehicle, comprising:
a rotor configured to integrally rotate with a wheel;
a friction member configured to be pressed against the rotor; and
the braking-force-maintaining device for a vehicle according to claim 11,
wherein the first driving source is a motor, the motor is drivingly connected to the friction member, and
a braking force in accordance with a force pressing the friction member against the rotor is applied to the wheel.

* * * * *